(12) United States Patent
Mualla

(10) Patent No.: US 6,840,016 B1
(45) Date of Patent: Jan. 11, 2005

(54) DEVICE FOR DAMPING MOVEMENTS OF STRUCTURAL ELEMENTS AND A BRACING SYSTEM

(76) Inventor: Imad H. Mualla, Hvidsværmervej 30 B, DK-2610 Rødovre (DK)

( * ) Notice: Subject to any disclaimer, the term of this patent is extended or adjusted under 35 U.S.C. 154(b) by 0 days.

(21) Appl. No.: 10/048,362

(22) PCT Filed: Aug. 3, 2000

(86) PCT No.: PCT/DK00/00433

§ 371 (c)(1),
(2), (4) Date: Feb. 14, 2002

(87) PCT Pub. No.: WO01/09466

PCT Pub. Date: Feb. 8, 2001

Related U.S. Application Data
(60) Provisional application No. 60/147,380, filed on Aug. 6, 1999.

(30) Foreign Application Priority Data

Aug. 3, 1999 (DK) .......................................... 1999 01087

(51) Int. Cl.[7] .............................................. E04H 9/02
(52) U.S. Cl. .................... 52/167.1; 52/167.3; 52/167.6; 52/167.8
(58) Field of Search ............................. 52/167.1–167.9

(56) References Cited

U.S. PATENT DOCUMENTS

| | | | |
|---|---|---|---|
| 3,418,768 A | | 12/1968 | Cardan |
| 3,940,895 A | * | 3/1976 | Yamamoto et al. ........ 52/167.1 |
| 4,121,393 A | | 10/1978 | Renault et al. |
| 4,368,525 A | * | 1/1983 | Obata et al. ................. 367/165 |
| 4,409,765 A | | 10/1983 | Pall |
| 4,499,694 A | | 2/1985 | Buckle et al. |
| 4,574,540 A | | 3/1986 | Shiau |
| 4,910,929 A | | 3/1990 | Scholl |
| 4,921,202 A | | 5/1990 | Miyake |

(List continued on next page.)

FOREIGN PATENT DOCUMENTS

| | | |
|---|---|---|
| CN | 1048577 A | 1/1991 |
| JP | 8-193635 | 7/1996 |
| JP | 9-264362 | 10/1997 |
| JP | 10-018418 | 1/1998 |
| JP | 10-311164 | 11/1998 |
| JP | 11-036655 | 2/1999 |
| WO | 99/20859 | 4/1999 |

Primary Examiner—Jeanette E. Chapman
(74) Attorney, Agent, or Firm—Birch, Stewart, Kolasch & Birch LLP

(57) ABSTRACT

The invention relates to the protection of structural systems such as apartment houses against dynamic loading caused by earthquakes, wind, traffic etc. When a frame structure is excited by a horizontal external force, the girders starts to displace horizontally. If such displacements are large or if they occur periodically they may have serious impact on the conditions of the structure and may cause severe damages or even result in a collapse. The present invention relates to a very simply designed and easily produced damper with two members being interconnected in a rotational joint. By means of the arrangement of the damper in the structural system, displacement occurring in the system is transferred to the members being forced to rotate in relation to each other. Frictional resistance between the two members is dampening the rotational movement and thus the displacement in the system. The invention further relates to a device wherein the frictional resistance may be varied dynamically based on the displacements occurring in the system.

25 Claims, 22 Drawing Sheets

U.S. PATENT DOCUMENTS

Figure 1:
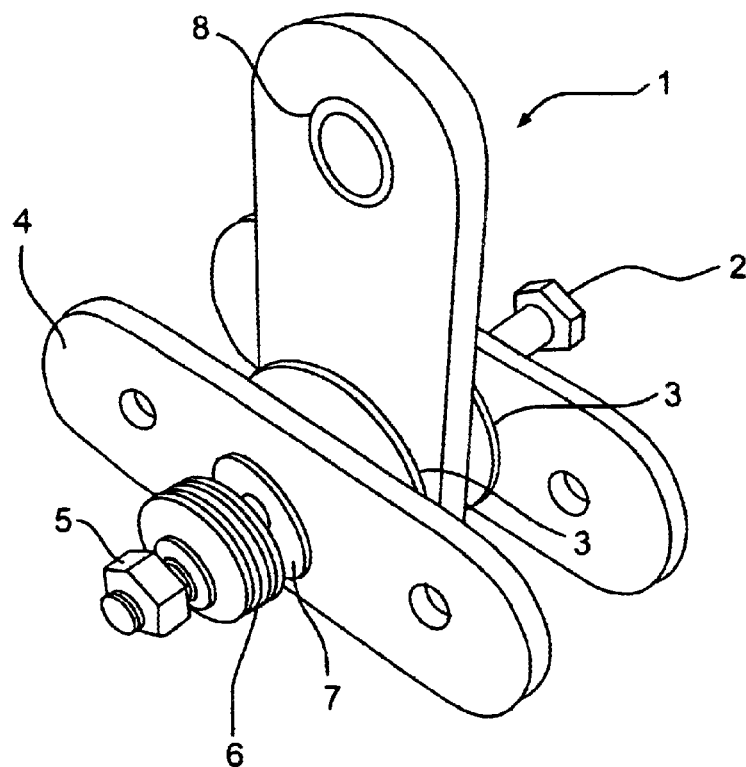

| | | | |
|---|---|---|---|
| 5,036,633 A | * | 8/1991 | Kobori et al. .................... 52/1 |
| 5,090,166 A | | 2/1992 | Johnson et al. |
| 5,127,760 A | | 7/1992 | Brady |
| 5,148,642 A | | 9/1992 | Plumier et al. |
| 5,205,529 A | | 4/1993 | Killian |
| 5,301,480 A | * | 4/1994 | Oyama et al. ............. 52/126.6 |
| 5,375,382 A | | 12/1994 | Weidlinger |
| 5,412,843 A | | 5/1995 | Krongauz et al. |
| 5,456,047 A | | 10/1995 | Dorka |
| 5,491,938 A | * | 2/1996 | Niwa et al. ................ 52/167.1 |
| 5,502,932 A | | 4/1996 | Lu |
| 5,533,307 A | * | 7/1996 | Tsai et al. .................. 52/167.3 |
| 5,657,597 A | | 8/1997 | Loftus |
| 5,819,484 A | | 10/1998 | Kar |
| 5,845,438 A | | 12/1998 | Haskell |
| 5,875,589 A | * | 3/1999 | Lai et al. .......................... 52/1 |
| 5,915,676 A | | 6/1999 | Abiru et al. |
| 5,979,126 A | * | 11/1999 | Kurino et al. ............. 52/167.2 |
| 6,141,919 A | * | 11/2000 | Robinson ................... 52/167.7 |
| 6,192,637 B1 | * | 2/2001 | Boilen et al. .............. 52/167.3 |
| 6,233,884 B1 | * | 5/2001 | Tipping et al. ............ 52/167.1 |
| 6,341,258 B1 | * | 1/2002 | Inoue et al. .................. 702/56 |
| 6,543,077 B2 | * | 4/2003 | Ouchi et al. ................ 14/77.1 |

* cited by examiner

TEST RESULTS FROM BRASS DISCS.

A. FORCE HISTORY PLOT FOR 60 CYCLE TEST.
B. BOLT CLAMPING FORCE HISTORY.
C. FORCE - DISPLACEMENT HYSTERISES.
D. ZOOM OF FORCE - DISPLACEMENT HYSTERISES SHOWING VARIATION OF FORCE.

EFFECT OF DISPLACEMENT AMPLITUDE ON THE AMOUNT OF ENERGY DISSIPATION.

EFFECT OF USING DIFFERENT CLAMPING FORCES (Ft) ON THE AMOUNT OF FRICTION FORCE.

EFFECT OF CLAMPING FORCE (Ft) ON THE AMOUNT OF ENERGY DISSIPATION.

A : DISPLACEMENT HISTORY FOR 0.5 Hz FREQUENCY AND 3.3 kN CLAMPING FORCE

B: ZOOMING FOR LAST 5 CYCLES

A. FORCE HISTORY FOR 400 CYCLES.
B. BOLT CLAMPING FORCE HISTORY.
C. FORCE - DISPLACEMENT HYSTERISES.
D. DISPLACEMENT HISTORY FOR THE LAST 10 CYCLES.

2mm AMPLITUDE

SINGLE STORY STEEL FRAME MODEL

DEVICE FOR DAMPING MOVEMENTS OF STRUCTURAL ELEMENTS AND A BRACING SYSTEM

This application is the national phase under 35 U.S.C. § 371 of PCT International Application No. PCT/DK00/00433 which has an International filing date of Aug. 3, 2000, which designated the United States of America and was published in English which claims the benefit of U.S. provisional application No. 60/147,380 filed Aug. 6, 1999.

TECHNICAL FIELD

This invention generally relates to the protection of structural systems against dynamic loading such as earthquakes or impact from oceanic waves, vibrations from traffic or impact of the wind. More specifically the invention relates to damping of motion or vibration in structures.

BACKGROUND OF THE INVENTION

When a frame structure is excited by a horizontal external force, the girders starts to displace horizontally. If such displacements are large or if they occur periodically they may have serious impact on the conditions of the structure and may cause severe damages or even result in a collapse.

Dampers play an important role in the protection of structures such as buildings, and they exist in numerous variants. Dampers are typically damping the motion by means of a frictional force between two moving parts attached to the frame structure of the building or by means of a fluid being pressed to flow between two chambers through a restricted tube. Other similar well-known methods of damping motion or vibrations exist. Some dampers are actively changing the damping effect corresponding to external conditions, and other dampers are passive dampers having a constant damping characteristic. Typical dampers are costly to produce and even more costly to assemble into a structural frame of a building. Typically a building have to be designed for a specific damper, either due to the bulky design of the existing dampers or due to correlation between the structural characteristics of the damper versus the characteristics of the building.

U.S. Pat. No. 4,409,765 (Pall) Relates to a building having a pair of structural elements with a member connecting these structural elements and where the member has a slip joint with frictional surfaces. The slip joint furthermore has clamping means for forcing the frictional surfaces together. The patent does not disclose a rotational hinge like assembly of the damper, providing a rotational friction.

DESCRIPTION OF THE INVENTION

It is an object of the present invention to provide a damper that is based on a very simple design and comprising parts that are easily produced. At the same time the damper must be easy to assemble and flexible both for arrangement in different bracing systems as well as in confined spaces and both for retrofitting in existing structures as well as for new structures. A further advantage of the present invention is a constant damping effect and a price efficient and reliable system.

The objects of the invention are fulfilled according to the invention by a device for damping movements of structural and non structural elements in civil engineering structures, the device comprising:
  at least two members being interconnected in a rotational joint for frictional damping of relative rotational movement between the at least two members. The device comprises
  clamping means for clamping the at least two members together, so as to maintain a clamping force and friction between the at least two members in the rotational joint, and
  means for connecting each of the at least two members to respective ones of the structural elements.

The structural element in civil engineering could be beams, columns and slabs. The wall being dampened may comprise a combination of structural elements as well as non structural elements, and consequently the damper may dampen the movement of both structural and non structural elements. The non structural elements could be windows, doors, infill walls such as brick walls, panels and partition walls.

Accordingly:
  The damper device can be mounted in 2 or more directions e.g. in a several storeys building.
  The damper device can be mounted in reinforced concrete frame structures with infill brick walls.
  The damper device can be mounted in large panel walls to reduce their sliding failure mechanism. The panels would typically be made from concrete but they may be made from other material such as timber, steel or composite materials.
  The damper device can be mounted in elevated water tanks to reduce their vibration response.
  The damper device can be mounted in bridges and elevated highways. It can be installed in two directions to reduce the response. As an example a number of dampers may be arrange in a first direction and a number of dampers may be arranged in a second direction. The dampers in the first direction may be provided with a damping structure, which is different from the damping structure of the dampers arranged in the second direction.
  The damper device can be used to reduce the vibration caused by elevated machines, which are mounted on a frame structure.
  The damper device can be mounted in many kinds of offshore structures to reduce their vibration response due to wave loads, e.g. from water or wind.
  The damper device can be mounted in ready-made garages.
  The damper device can be mounted in portable metal tents for damping the movements of the carrying columns and beams of the tent.
  The damper device can be used to reduce the rotation of joints in frame structures.
  The damper device can be mounted in several storeys industrial buildings.
  The damper device can be mounted in timber frame structures.
  The damper device can be mounted in metal towers.

According to a preferred embodiment of the invention the damper is adapted for damping the movement of prefabricated panels or walls made of timber or light weight metal frames such as frames made from a light weight steel alloy. The panels could as an example be made in a panel factory and be pre-mounted with the damper. The dampers could be either pre-adjusted for a specific use of the panel or the dampers could be adjusted at a later stage when they are mounted, e.g. in a residential structure.

The nature of the damper enables the use of the damper both in existing structures as well as in new structures due the simplicity of the concept.

The device may comprise a frictional pad arranged between the two members in a sandwich fashion. The frictional pad provides a dry frictional lubrication and intends to maintain a mainly constant frictional coefficient. At the same time the frictional pad intents to dampen the grinding noise prevailing from the frictional movement of the members.

The device may furthermore comprise means adapted to vary the clamping force. By varying the clamping force the frictional force and thereby the damping characteristic is being changed and can thus be adapted for a specific purpose, e.g. to match the movement of a certain wind force, earthquake etc. The means for varying the clamping force could be an electro-mechanic, electro-hydraulic, pneumatic or similar mechanically or electrically controlled device enabling dampers in a building to be actively adjusted to actual conditions.

In a preferred embodiment of the invention the joint comprises a pin extending through each of the at least two members. The pin can act as the only member holding the damper together and thus provide for a easy fitting of the damper and adjustment of the damping effect. The frictional movement between the members or alternatively between the frictional pad arise from rotation of the members around the pin, which thus acts like a hinge pin.

In a preferred embodiment of the invention the device may comprise a bolt, where at least a portion of the bolt constitutes the pin, the bolt having:

a bolt member with a bolt head, a nut with a nut head, the clamping force being determined by the pretension of the bolt. This is a simple and reliable embodiment of the invention, where only simple tools are necessary for the assembly of the device as well as for the adjustment of the clamping force.

The device may further comprise means for maintaining a substantially constant clamping force overtime. This is essential, since the frictional force is a function of the clamping force and since the frictional force is adjusted to match the damping conditions.

The means for maintaining a substantially constant clamping force can comprise at least one spring arranged between the bolt head and a surface of one of the members and/or between the nut head and a surface of one of the members. The spring can preferably be a disc spring or more disc springs arranged in series or it could be one or more disc spring(s) arranged between the bolt head and a surface of one of the members, and another disc spring or more disc springs arranged between the nut head and a surface of another of the members.

In a preferred embodiment of the invention the at least two members comprise a side plate and a central plate extending in substantially parallel planes. The side plate could preferably be arranged in either fixed or pivotal connection with one of the braces of the bracing system, the brace being connected fixed or pivotally to a member of the frame structure at the other end. The central plate is attached fixed or pivotally to one of the members of the frame structure, so as respectively to prevent or allow relative rotational movement between the central plate and the structural element. In this setup the frictional pad can preferably be arranged between the side plate and the central plate and thus provide a constant friction between these plates. In a further preferred embodiment two side plates are accomplishing the central plate, each being arranged symmetrically around the central plate. Each of the two side plates are being connected pivotally or fixed to one of the structural members or to a brace of the bracing system, the braces being fixed or pivotally connected to members of the frame structure at the other end. In this setup it is preferred to adapt two frictional pads, each frictional pad being arranged between a respective one of the side plates and the central plate.

The frictional pad is intended to maintain a constant frictional force over a period of time and even after many cycles of movement. It has been found, that a friction pad material comprising a MK101 asbestos free friction material by Eurodeal A/S is suitable for the purpose. Furthermore it has been found, that a device wherein the side plates and/or the central plate are made of steel, anti-corrosive steel or brass is suitable but other materials are adaptable such as aluminium or any alloys comprising aluminium or any other steel material or composite of steel and plastics or composites of plastics and fibres of glass, carbon, kevlar or similar or composites of any ceramics materials and fibres of glass, carbon, kevlar or similar.

Preferably, the clamping force shows a variation of less than 10% such as 8% or even less than 7% such as 5% in a long term test, such as a 200–1000 cycle test such as a 400 cycle test with 0,2–1 Hz forcing excitement frequency such as 0,5 Hz forcing excitement frequency and an displacement amplitude of one of the at least two members of 1–20 mm such as 10 at an applied excitement force of +10 KN to −10 KN such as +/−2.5 KN and an initial clamping force of 1–8 KN such as 4 KN. In a specific test (cf. the below discussion of experimental results, the variation was 5% in a 400 cycle test).

It is further preferred that the damping characteristic is independent from the frequency of the force excitement. This is to ensure that the damping effect is independent from the force frequency of a specific earthquake, storm etc. It is preferred that the frictional moment in the frictional joint of the device shows a forcing frequency dependent variation of less than 10% such as 5% in the range 2–7 Hz at a nominal frictional moment of 100 –500 Nm such as 200 Nm in e.g. 30cycle tests at each frequency.

It is preferred that the relationship between displacement amplitude of one of the at least two members and energy dissipation in the frictional joint is substantially linear. This makes the damper easier to model and thereby easier to design for a specific purpose.

A further aspect of the present invention relates to a bracing for a building structure comprising at least two structural elements and a device for damping relative movements between the structural elements, the device comprises:

at least two members being interconnected in a rotational joint for frictional damping of relative rotational movement between the at least two members, clamping means for clamping the at least two members together, so as to maintain a clamping force and friction between the at least two members in the rotational joint, means for connecting each of the at least two members to respective ones of the structural elements.

Preferably the bracing system comprises any of the features of the damper according to the present invention. The device for damping could preferably comprise at least two side plates as earlier mentioned and which are interconnected at at least one of their ends by means of an interconnecting element, and wherein a brace is mounted to the interconnecting element. In a further preferred embodiment at least one of the side plates are being interconnected to one of the structural elements by means of a brace, and wherein the central plate is connected or mounted to another one of the structural elements. Furthermore at least one of the side plates could be connected to one of the structural elements by means of two braces, the two braces being connected to opposite ends of the side plate(s), and wherein the central plate is connected or mounted to another one of the structural elements.

The bracing system can be arranged with the side plates being connected to one of the structural elements by means of two braces and the damper being arranged in a V-shaped bracing. In some technical literature this kind of bracing is referred to as being an invert-V bracing or a Chevron Bracing. Similarly the bracing system can be arranged with at least one of the side plates being connected to one of the structural elements by means of two braces and the damper being arranged in a D-shaped bracing, and similarly the bracing system can be arranged with at least one of the side plates being connected to one of the structural elements by means of two braces and the damper being arranged in a K-shaped bracing. The choice of arrangement may depend on the actual situation and will be selected by a professional designer.

A further aspect of the invention relates to a damper for damping movements of large concrete panel walls in building structures, the device comprising:

at least one member interconnected to at least one panel in a first rotational joint, at least one member being further connected to another panel or similar part of the building structure in a second rotational joint, one or both of the first or the second rotational joints providing a frictional damping of relative movement between the at least one member and the panel or similar building structure, one or both of the first or the second rotational joints further providing a sliding movement of the at least one member in relation to the panel or similar building structure to which it is attached, the sliding being enabled by means of a tolerance allowing movement in two perpendicular directions.

clamping means for clamping the at least one member together with the panel or similar building structure, so as to maintain a clamping force and friction between the at least one member and the panel or similar building structure in the rotational joint.

DETAILED DESCRIPTION OF THE INVENTION

Figure 2:
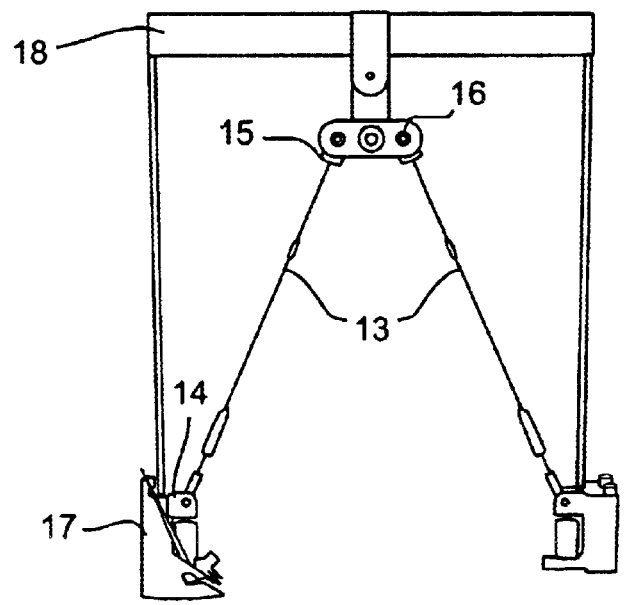
Figure 3:
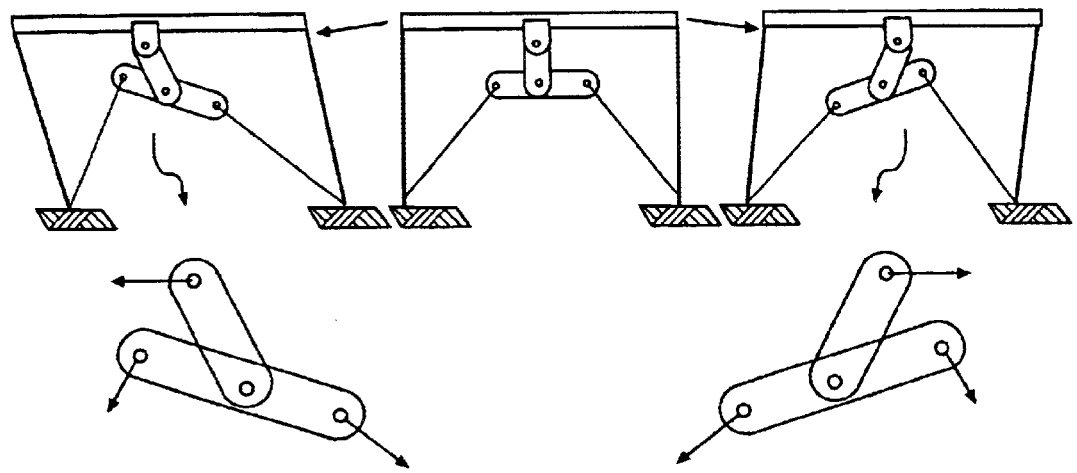
Figure 4:
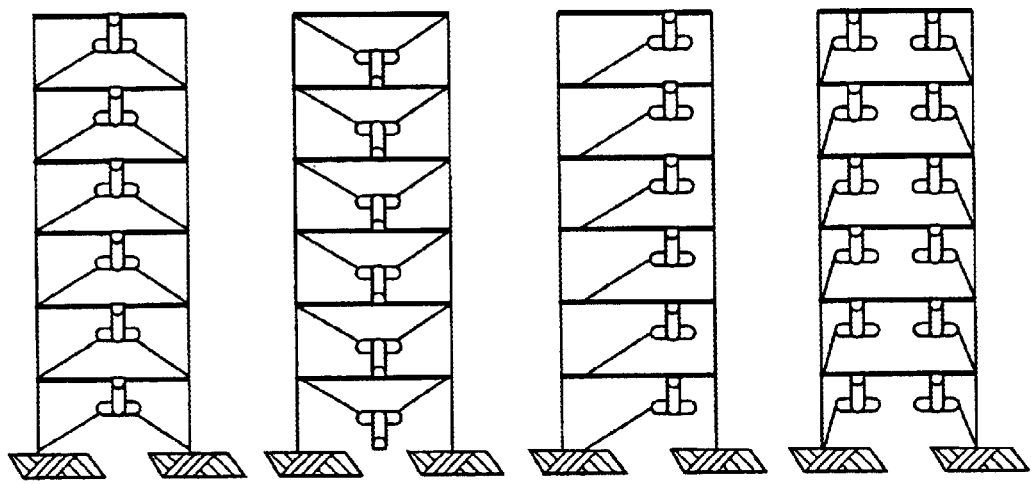
Figure 5:
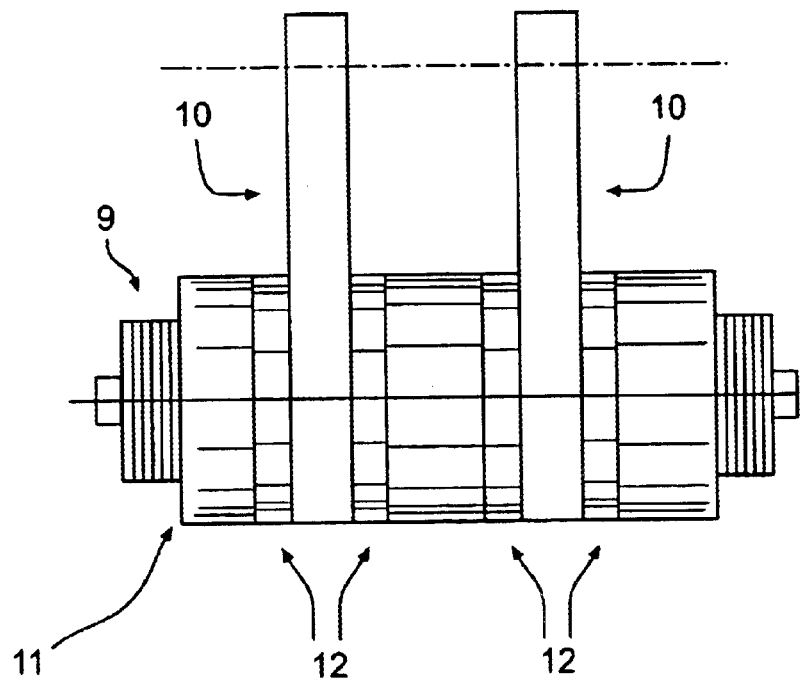
Figure 6:
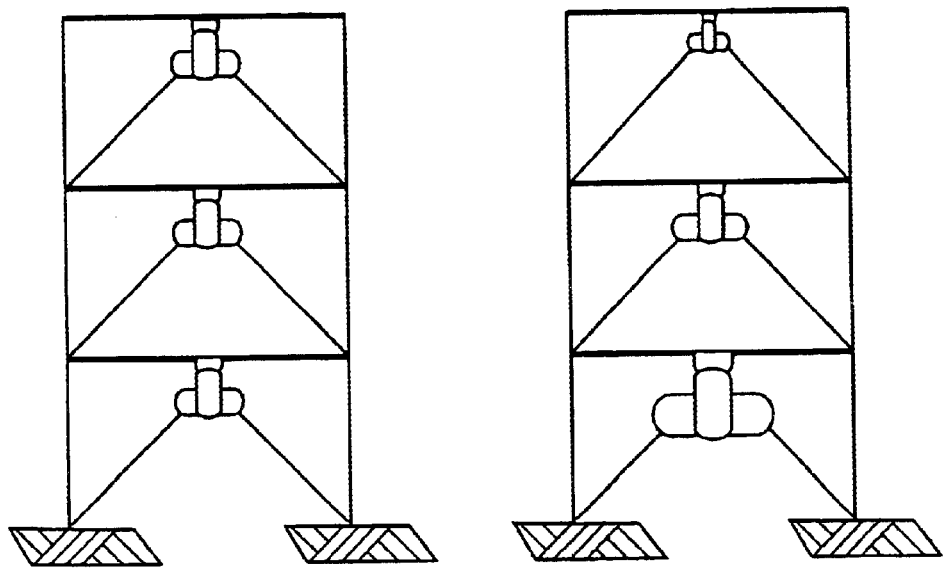
Figure 7:
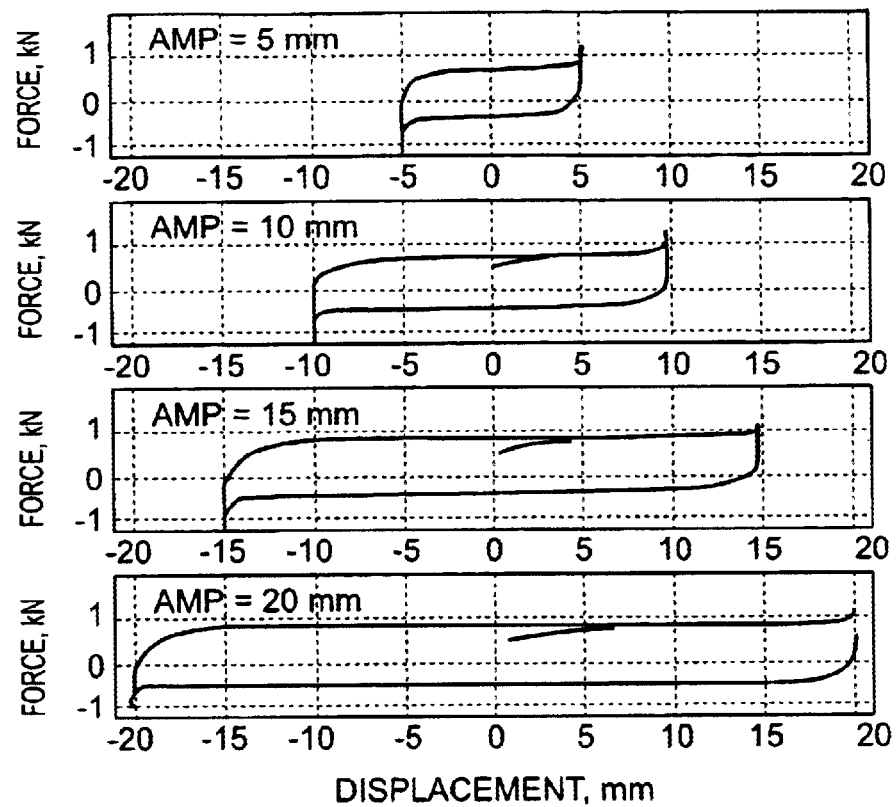
Figure 8:
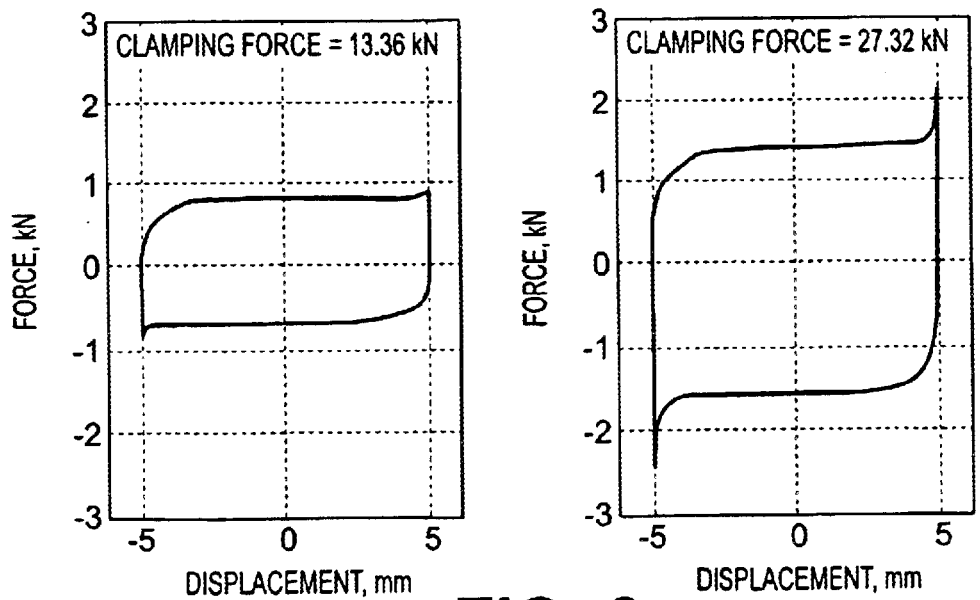
Figure 9:
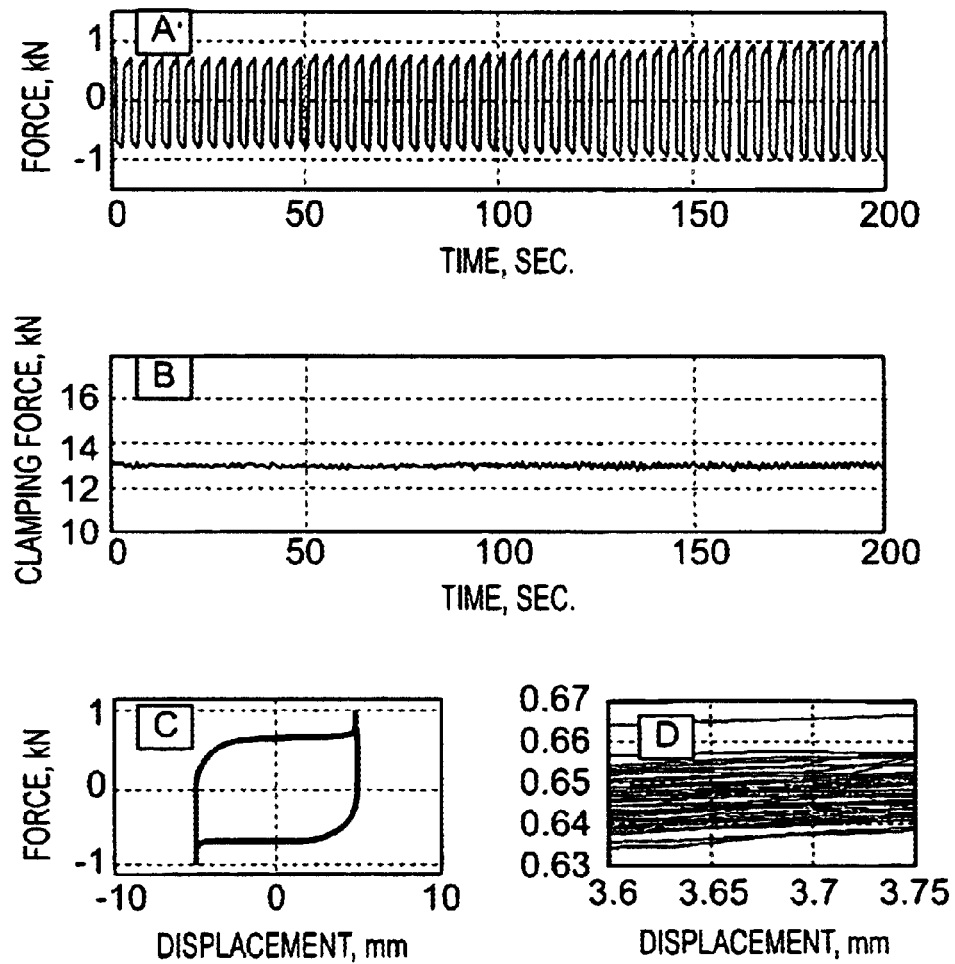
Figure 10:
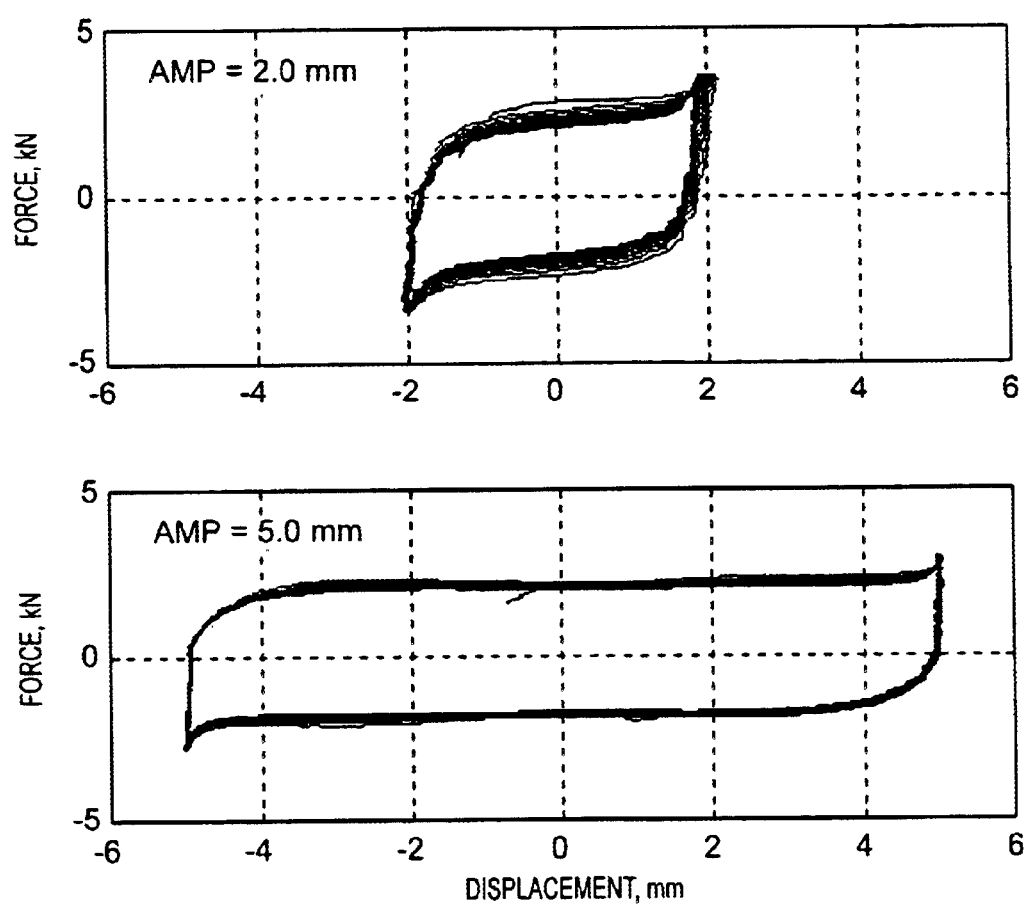
Figure 11:
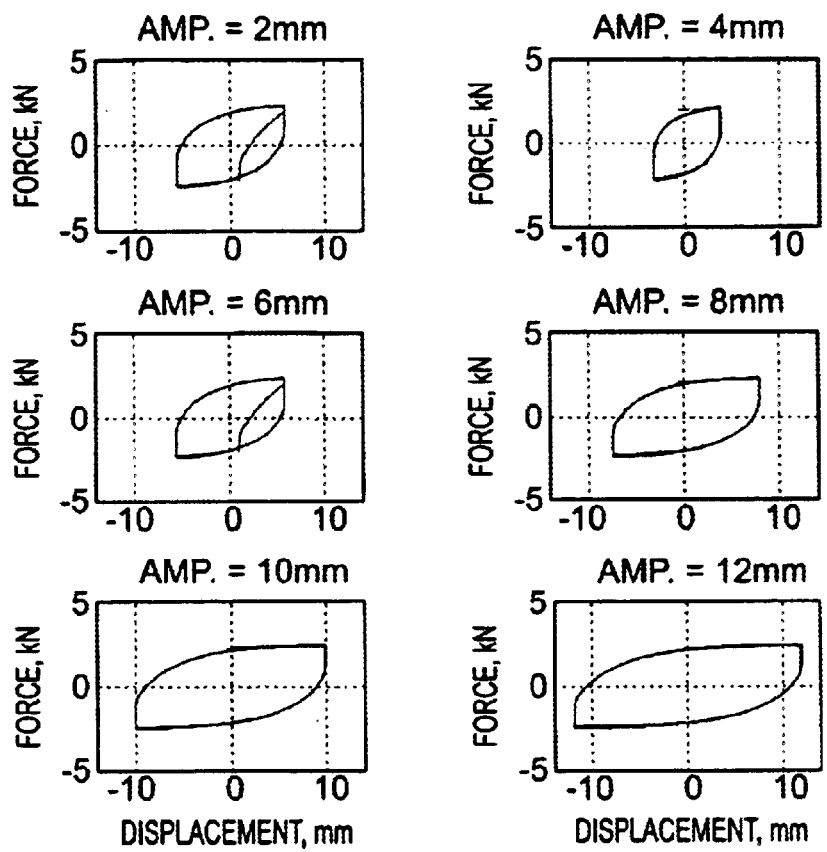
Figure 12:
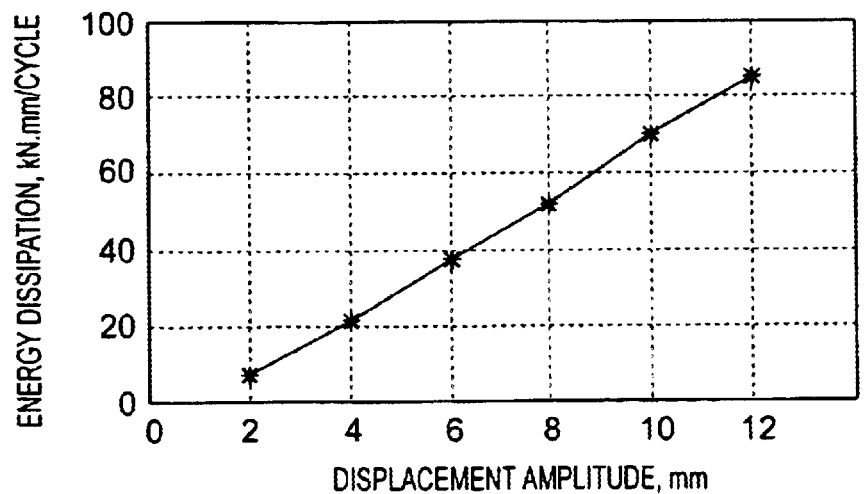
Figure 13:
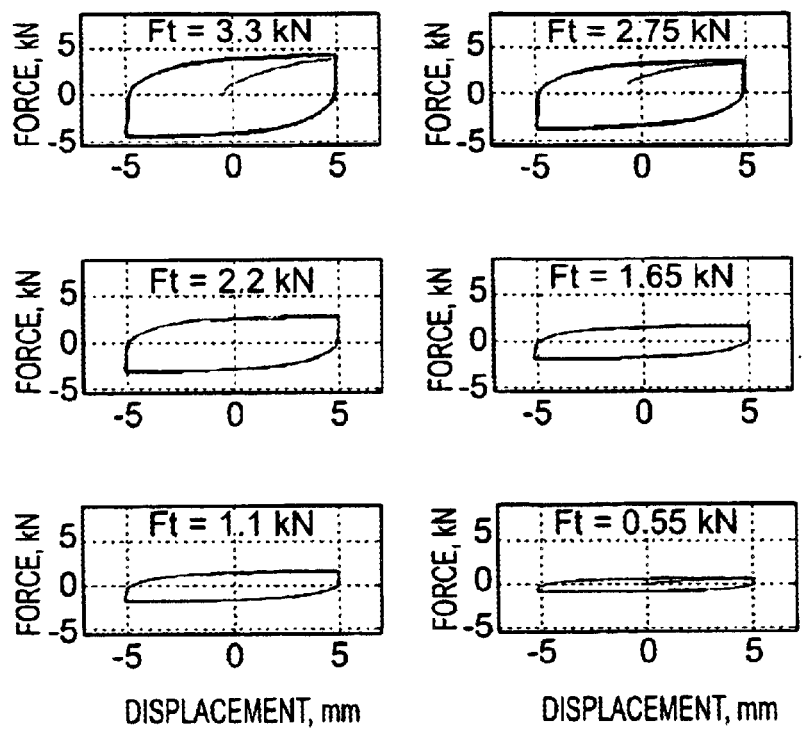
Figure 14:
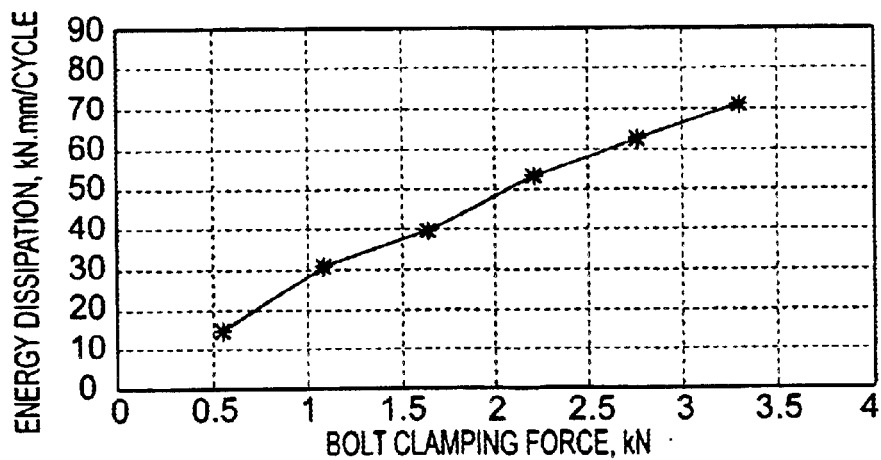
Figure 15:
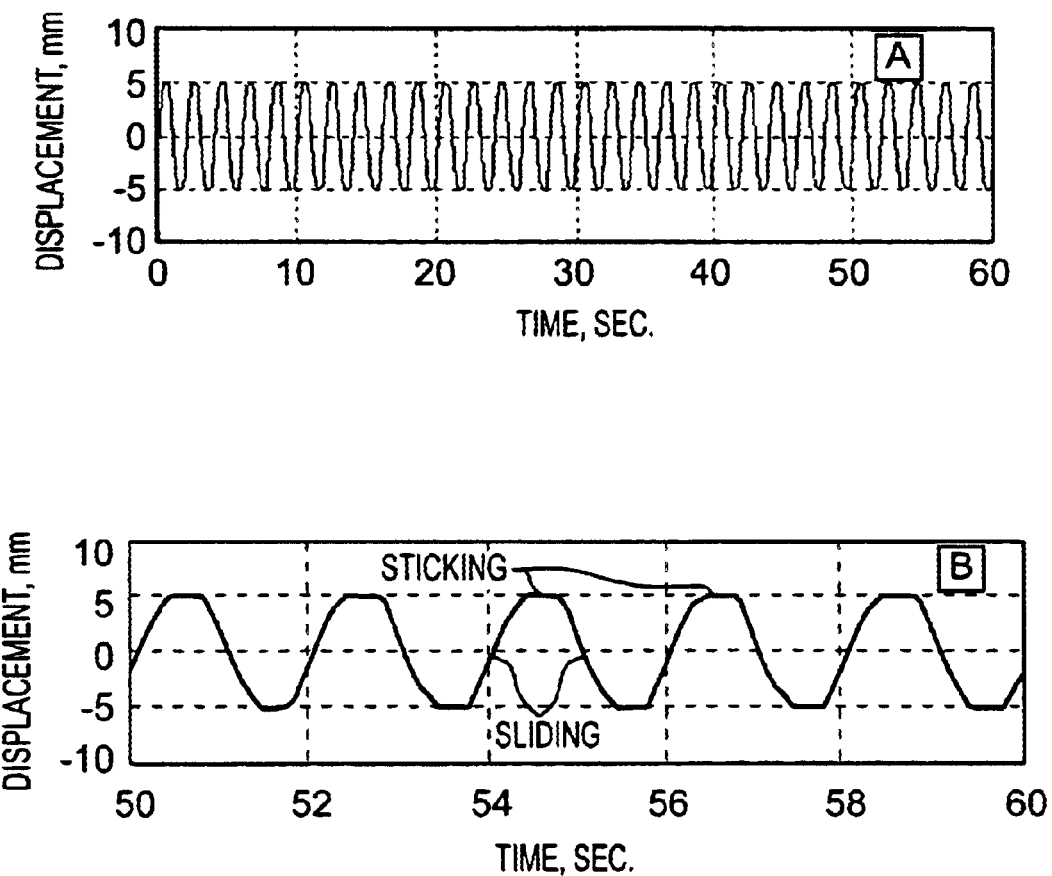
Figure 16:
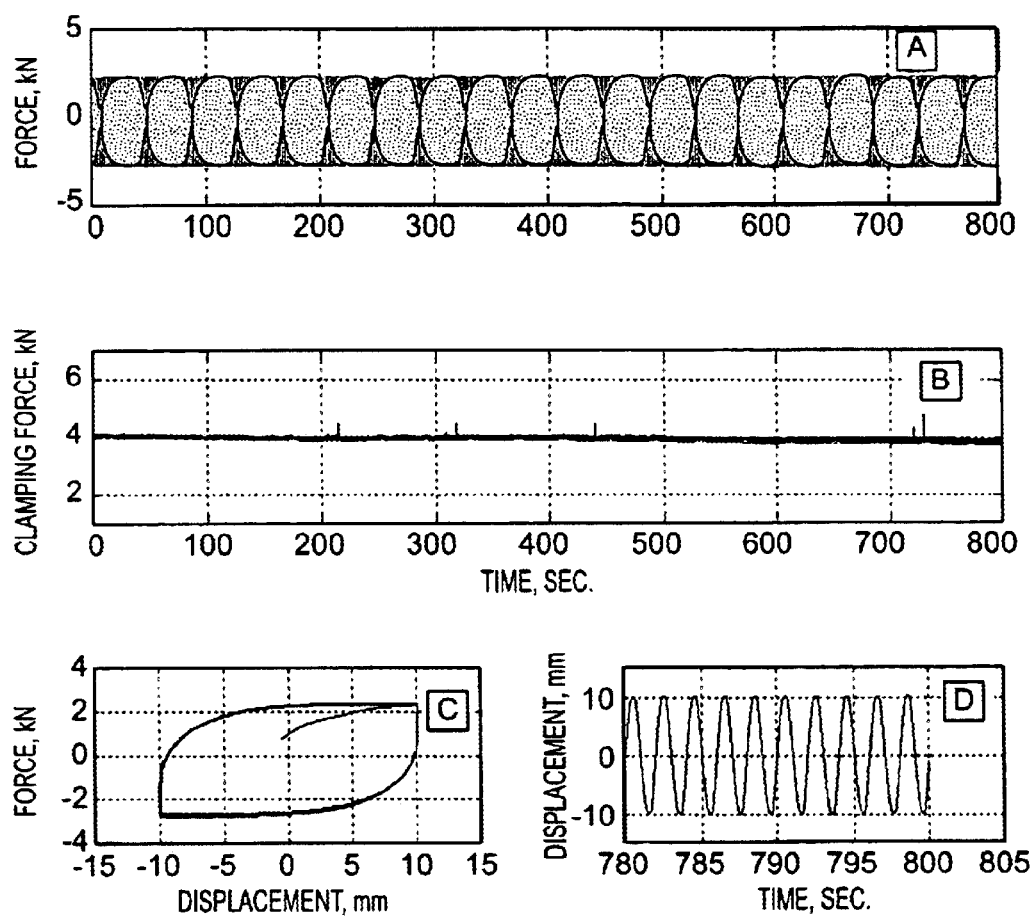
Figure 17:
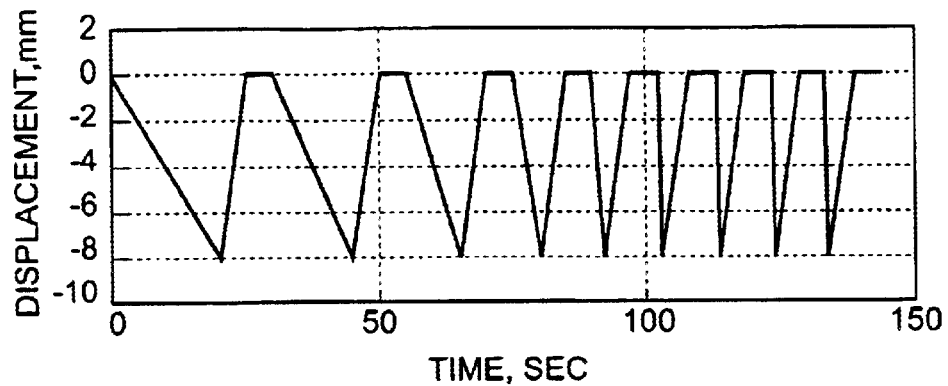
Figure 18:
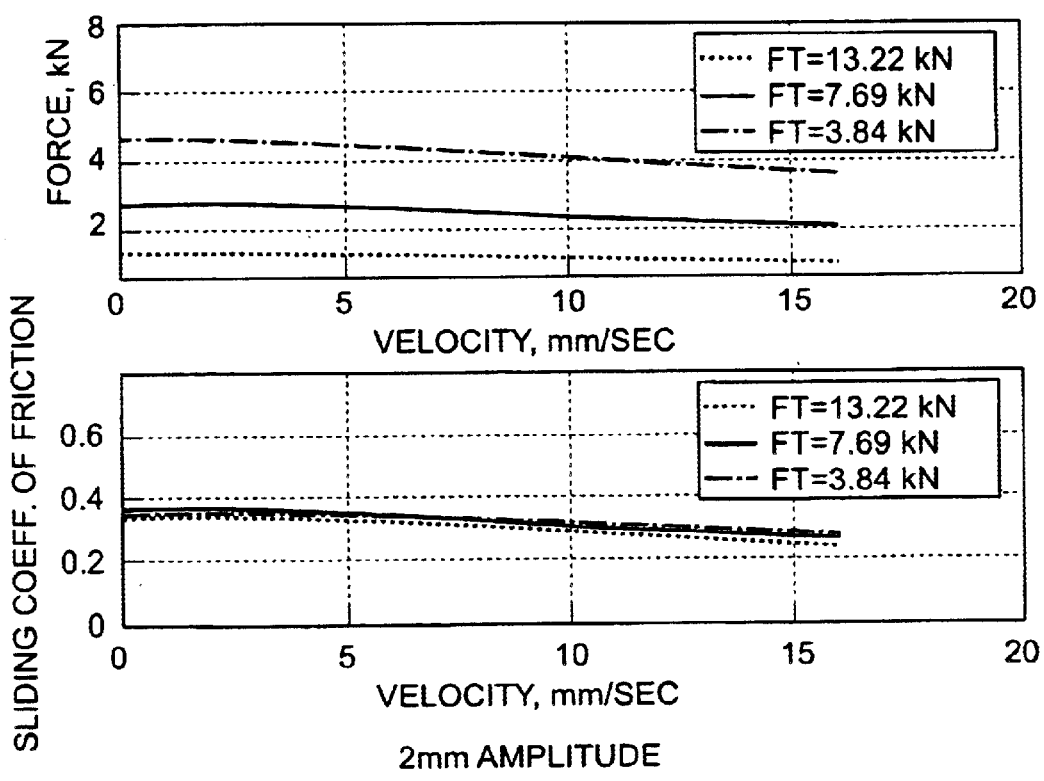
Figure 19:
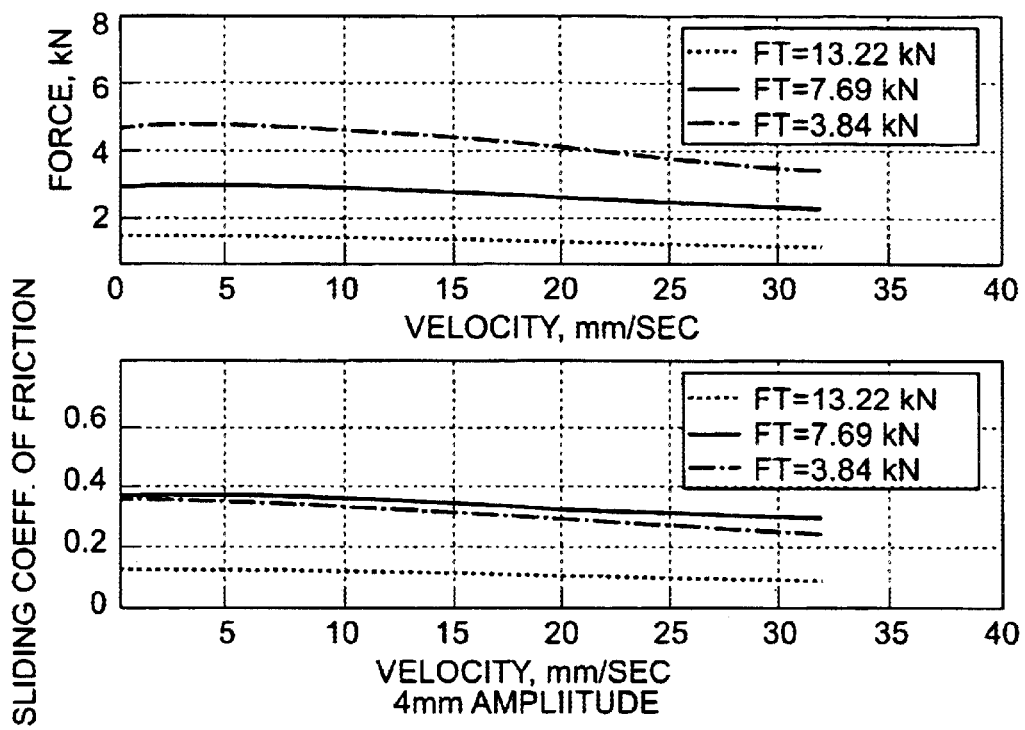
Figure 20:
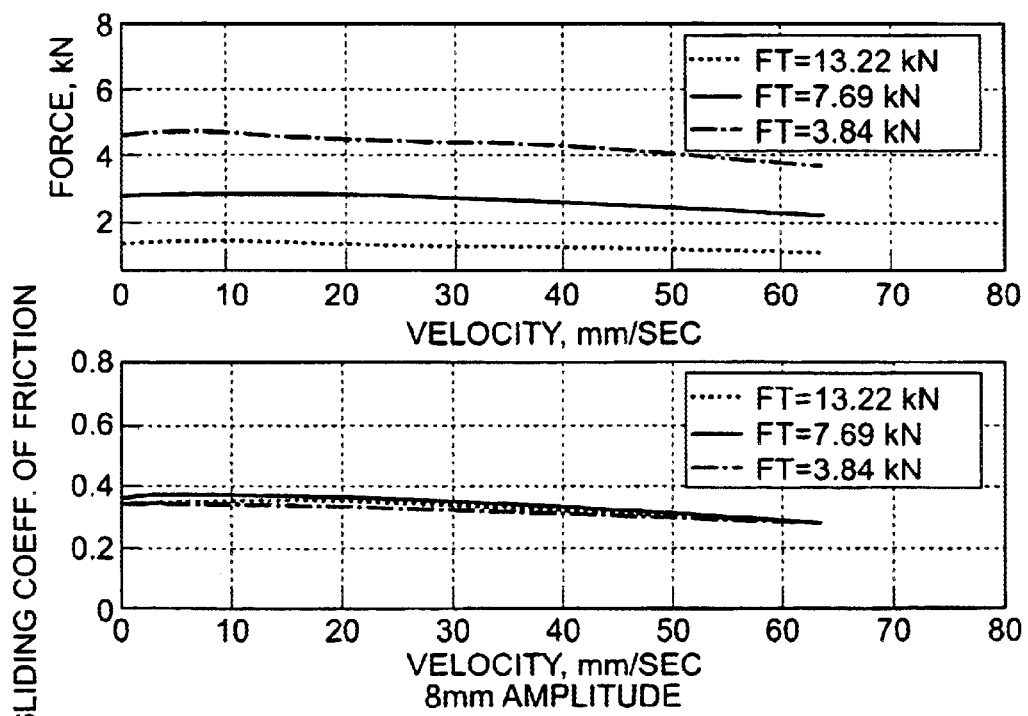
Figure 21:
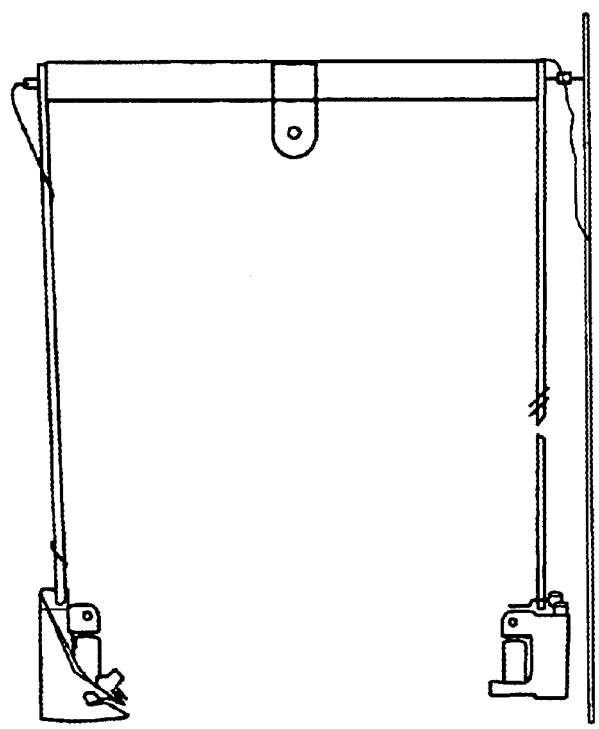
Figure 22:
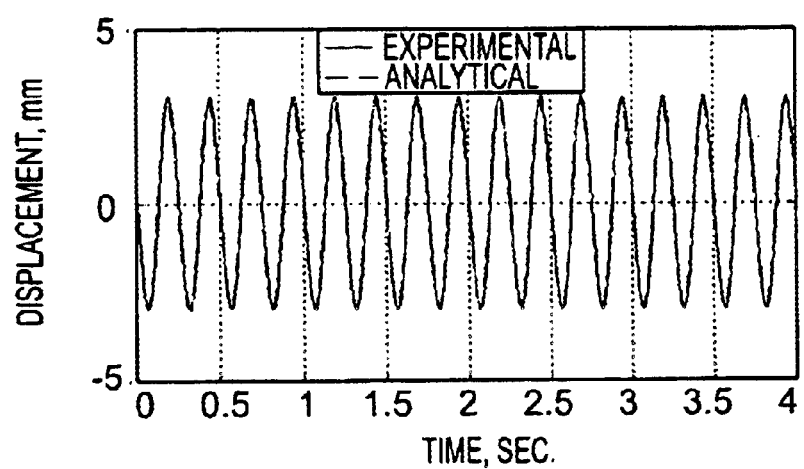
Figure 23:
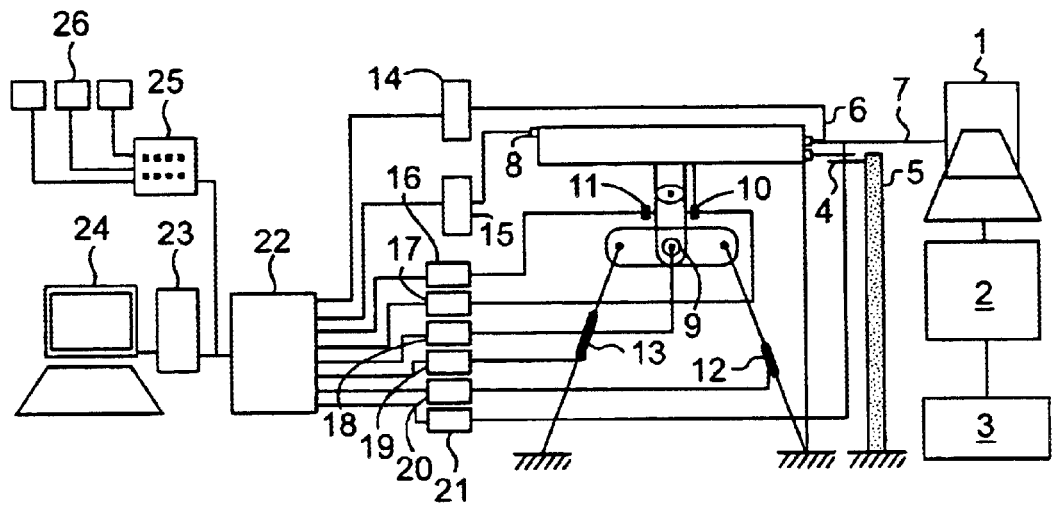
Figure 24:
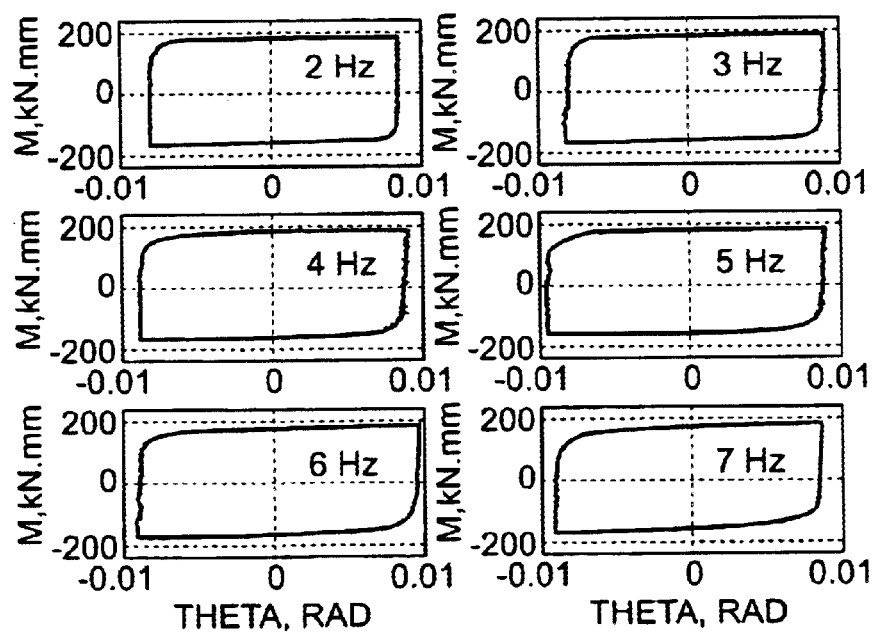
Figure 25:
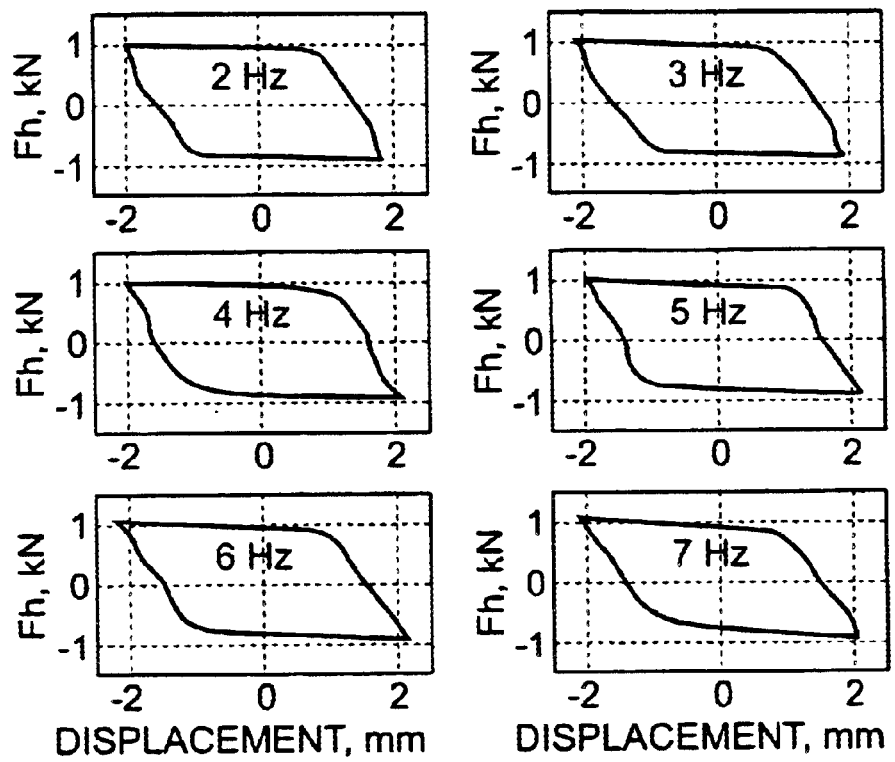
Figure 26:
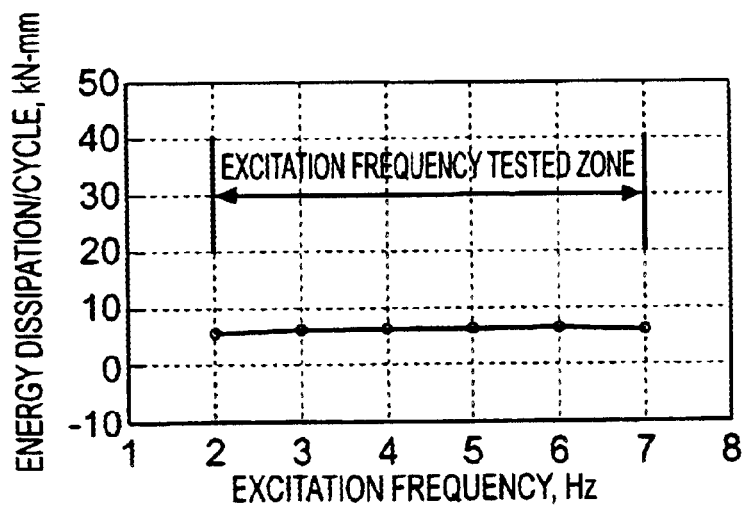
Figure 27A:
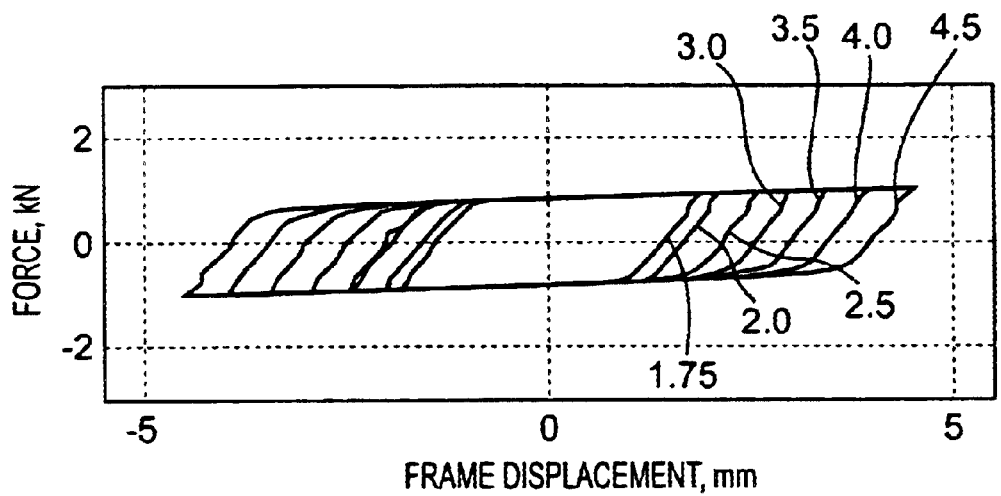
Figure 27B:
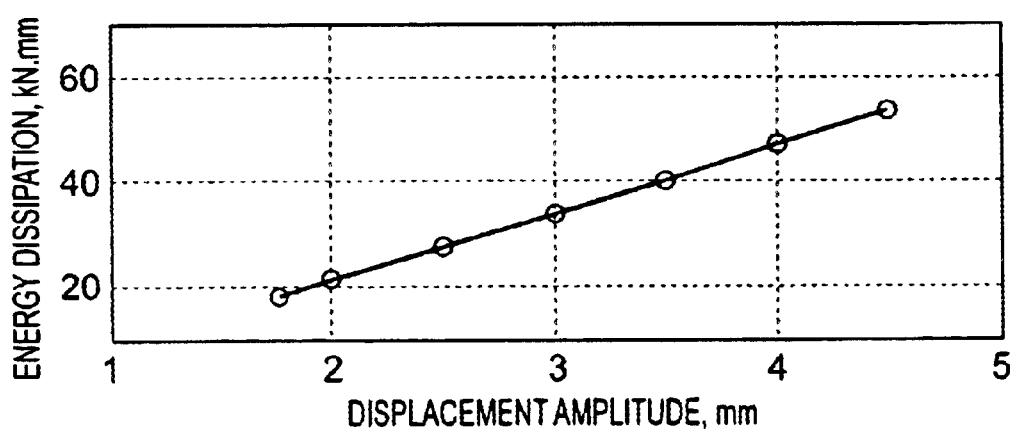
Figure 28A:
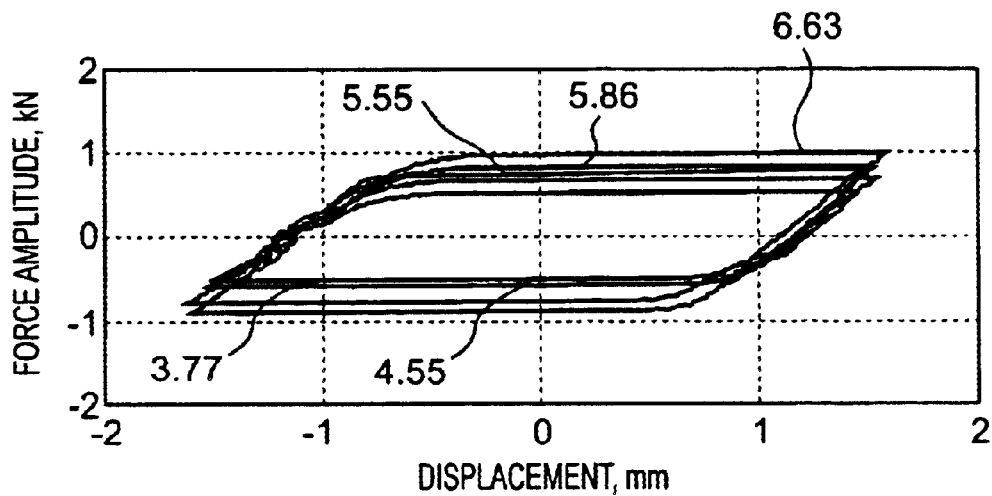
Figure 28B:
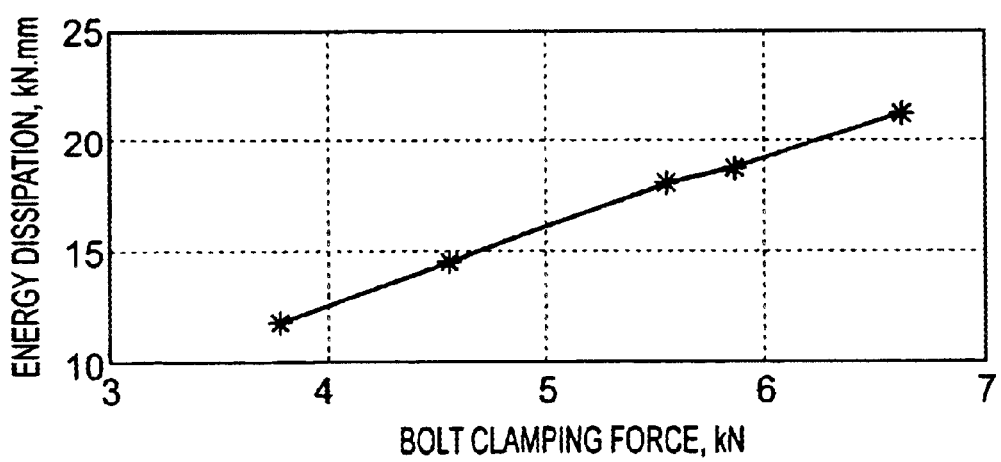
Figure 29A:
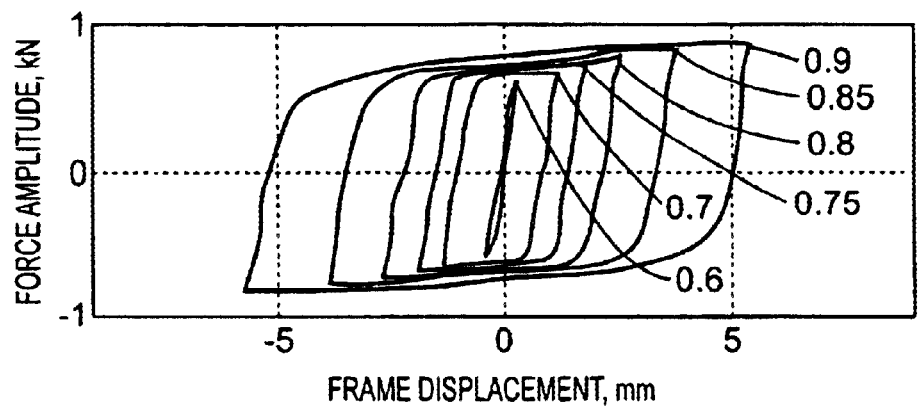
Figure 29B:
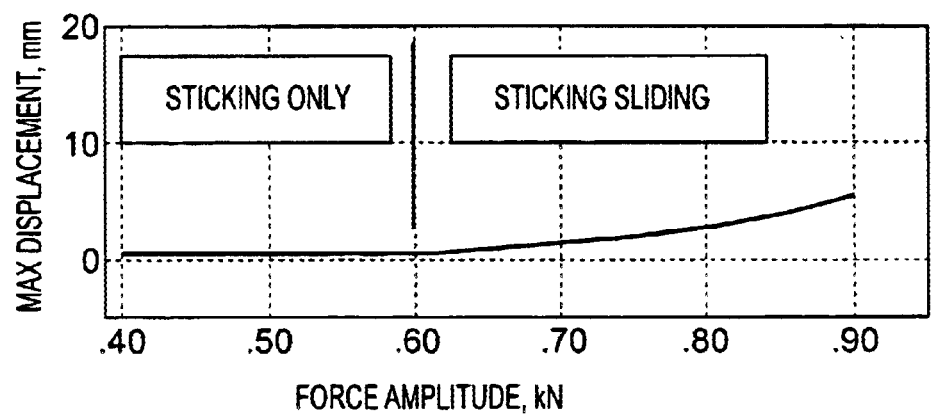
Figure 30:
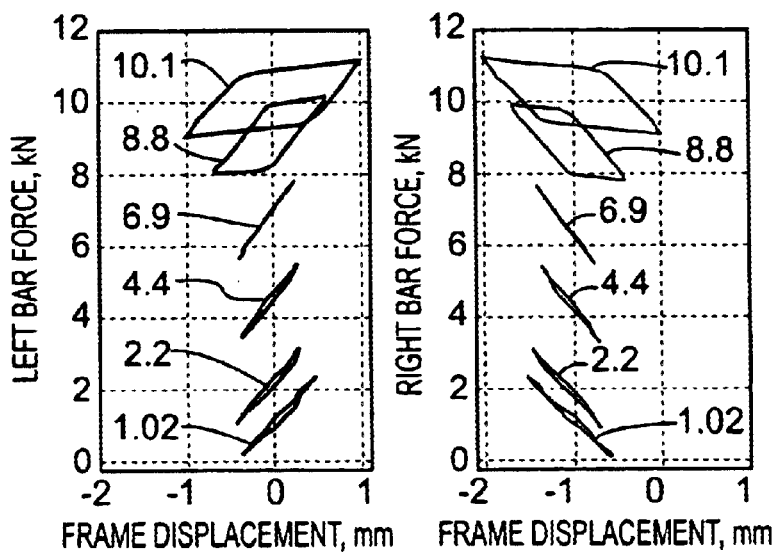
Figure 31:
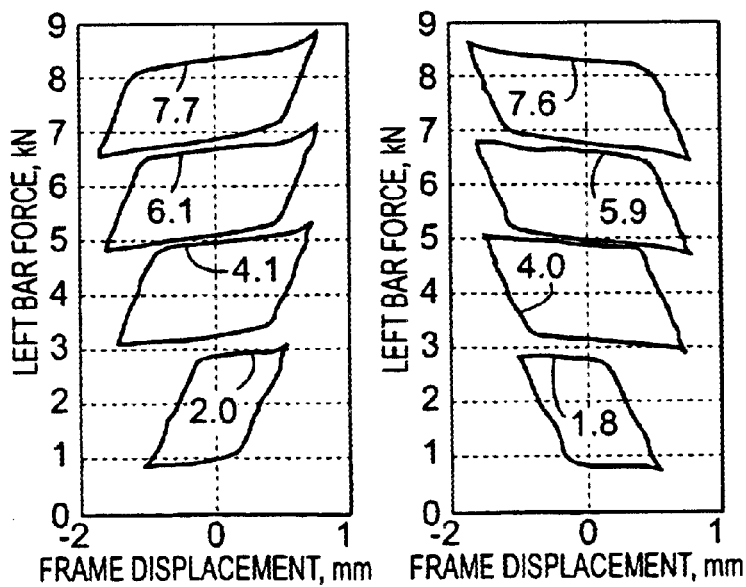
Figure 32A:
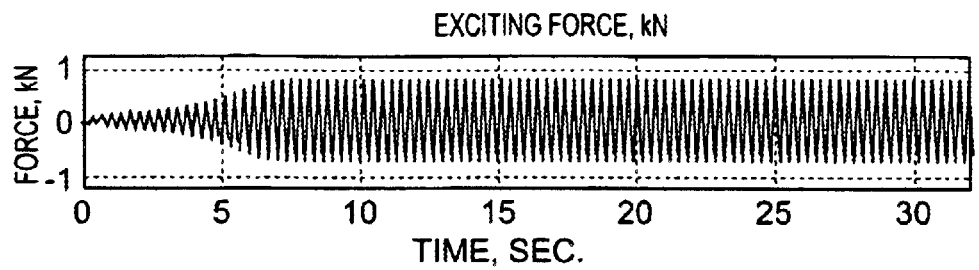
Figure 32B:
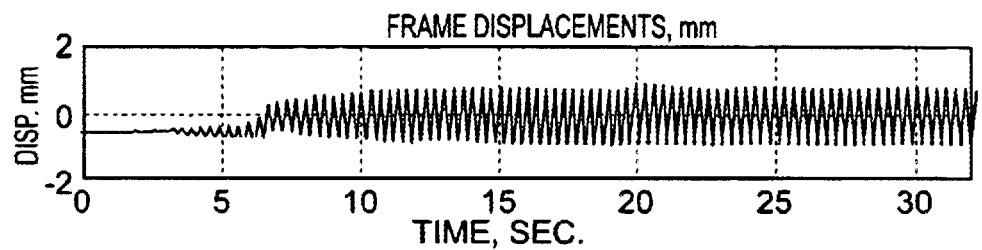
Figure 32C:
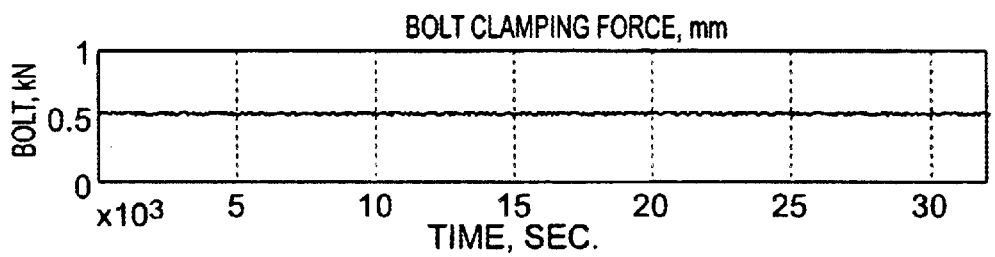
Figure 32D:
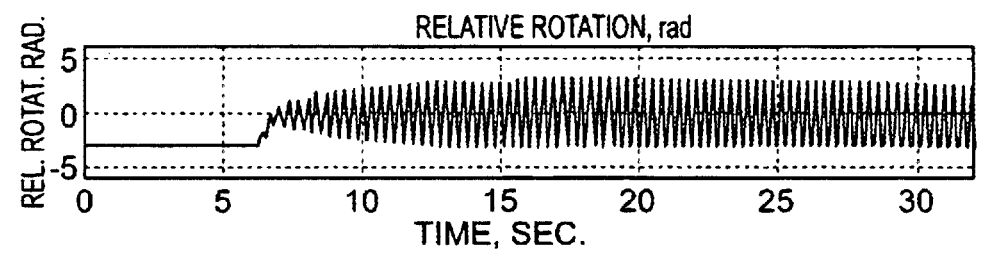
Figure 32E:
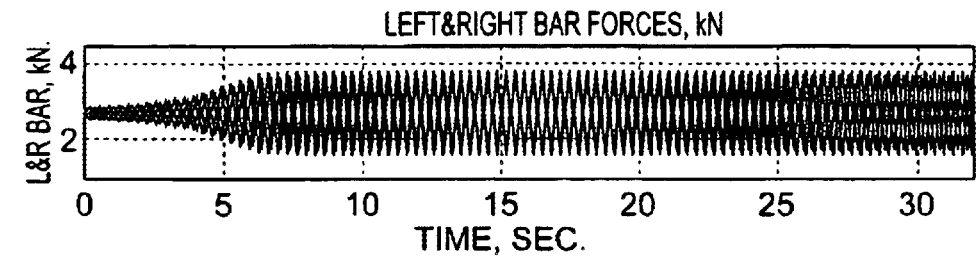
Figure 33:
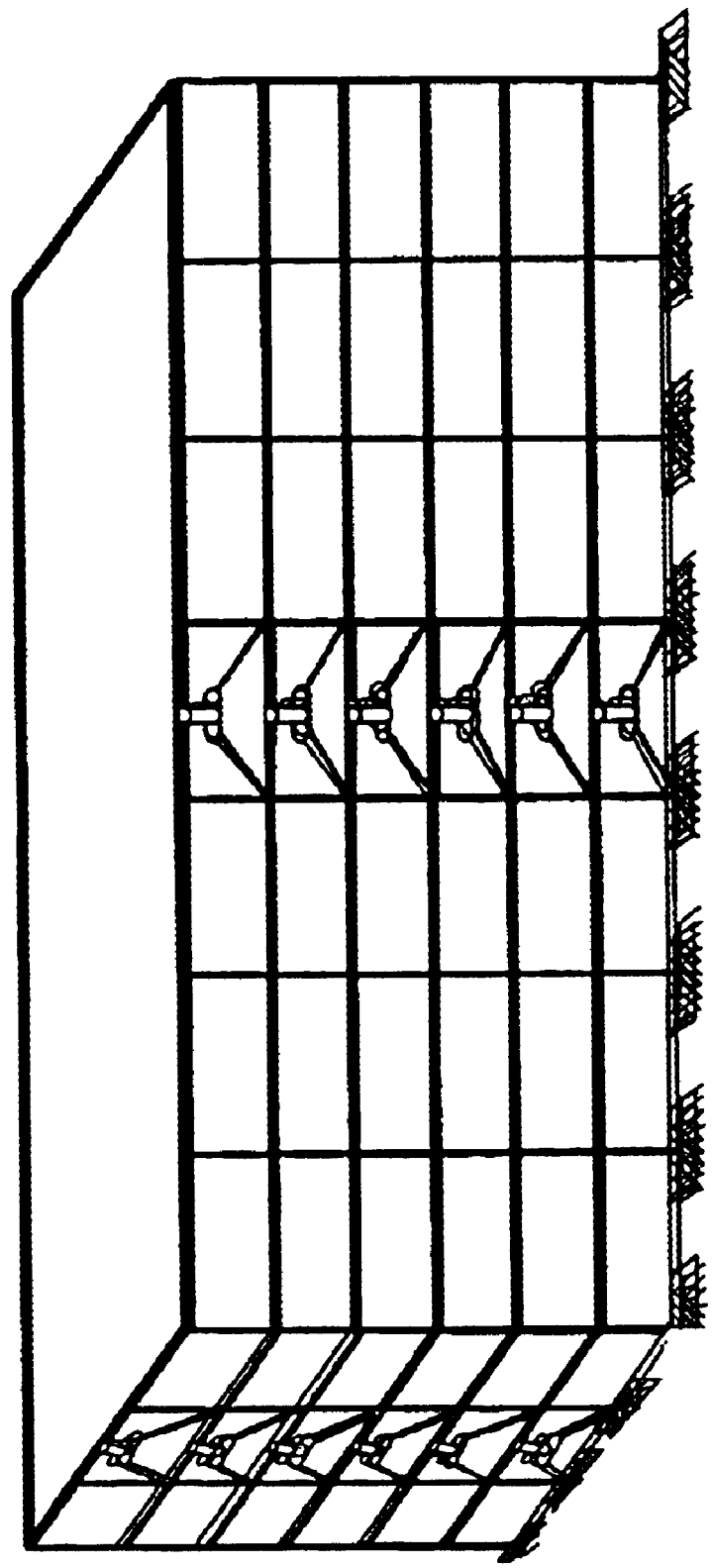
Figure 34:
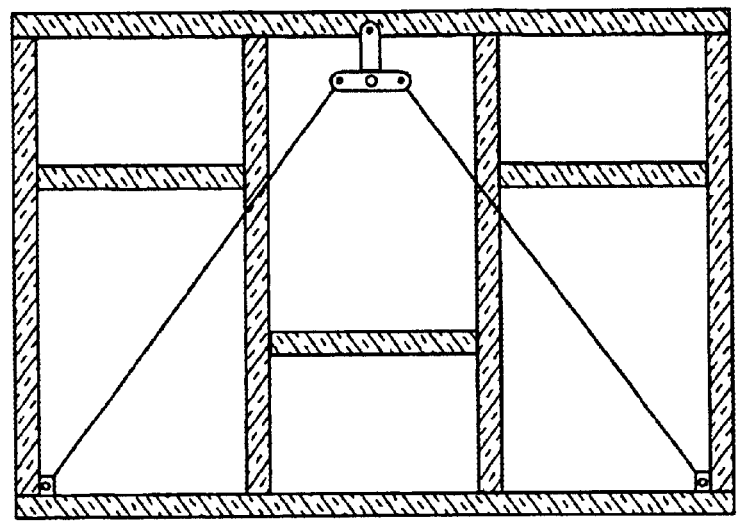
Figure 35:
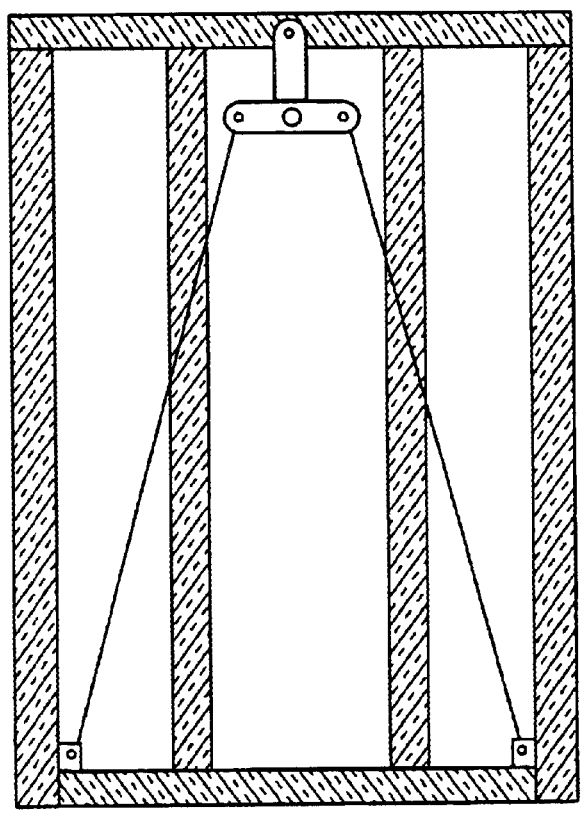

A preferred embodiment of the invention will now be described in details with reference to the drawing in which FIG. 1 is a perspective picture of details of the friction damper device, FIG. 2 shows a steel frame with a supplemental friction damper device, FIG. 3 shows the mechanism of the damper for damping movement of a frame, FIG. 4 shows the flexibility of using the friction damper in different types of bracing systems, FIG. 5 shows the possibility of having multiple unit dampers, FIG. 6 shows different settings for the damper within structures, FIG. 7 shows the effect of using different displacement amplitudes on the hysteresis loops, FIG. 8 shows the tested displacement in mm for two different clamping forces, FIG. 9 shows a force history plot for a 60-cycle test, a Bolt Clamping Force history, a force (displacement hysterises) and a Zoom of Force (displacement hysterises) for a devise with a brass disc, FIG. 10 shows the displacement effect for the highly frictional material, FIG. 11 shows the effect of displacement amplitude on the amount of energy dissipation, FIG. 12 shows the linear relation between displacement amplitude and energy dissipation, FIG. 13 shows the effect of using different clamping forces (Ft) on the amount of friction force, FIG. 14 shows the effect of clamping force (Ft) on the amount of energy dissipation, FIG. 15 shows the displacement history for 0.5 Hz frequency and 3.3 kN clamping force and zooming for last 5 cycles, FIG. 16 shows the force history for 400 cycles, Bolt Clamping Force history, Force—Displacement hysterises and Displacement history for the last 10 cycles, FIG. 17–FIG. 20 shows results from measuring the coefficient of friction, FIG. 21 shows the experimental setup for a frictional damper in a frame structure, FIG. 22 shows the results of a dynamic test, FIG. 23 shows the experimental setup for friction damper response measurements FIG. 24 shows the effect of Different Forcing Frequency 2, 3, 4, 5, 6 and 7 Hz on Moment—Theta relation, FIG. 25 shows the effect of forcing frequency 2, 3, 4, 5, 6 and 7 Hz on horizontal forces (Fh)—frame displacement relation, FIG. 26 show the exitation frequency tested zone, FIG. 27 shows the effect of different displacement amplitude on the frame response and energy dissipation—displacement relation FIG. 28 shows the effect of using clamping forces 3.77, 4.55, 5.55, 5.86, 6.63 and 6.89 kN on force amplitude. Effect of different clamping forces on energy dissipation, FIG. 29 shows the effect of forcing Amplitude on the frame response and the effect of forcing amplitude on maximum frame displacement, FIG. 30 shows the effect of prestressing force in bracing bars on frame displacement, FIG. 31 shows frame displacement in left and right bar, FIG. 32 show time history test results of 3.0 Hz forcing frequency and excitation force of 0.8 kN, FIG. 33 shows a multi-storey building with a damper device installed in two directions in at least one bay in each direction, and FIG. 34 and FIG. 35 shows pre-fabricated panel walls with dampers, the frame structure of the panels either made of timber or lightweight steel.

As seen in FIG. 1 the friction damper comprises several steel plates 1 and 4 rotating against each other. The damper may further comprise a number of circular disc shims of friction pad material—in FIG. 1 having numeral 3—placed in between the steel plates, in, order to have dry friction lubrication in the unit. The frictional pads are ensuring a stable frictional force acting on the steel plates and at the same time they reduce noise developed by the sliding movement between the plates.

In a preferred embodiment of the invention the damper comprise a central plate and two side plates. In FIG. 1 plate 1 is the central plate and plates 4 are the side plates. As seen in FIG. 2 the vertical plate pivotally connects the damper device to the girder of a frame structure through a hinge. The hinge is best seen in FIG. 1 and has numeral 8. The hinge is adapted in order not to introduce moment in the girder. This is essential e.g. when the damper is being retrofitted in buildings designed without the damper. Additionally the hinge increases the amount of relative rotation between the central plate and the side plates, which again increases the amount of energy dissipated in the system.

The two side plates 4 connect the damper to a bracing system such as a Chevron bracing—as seen in FIG. 2—or similar arrangement of braces e.g. in a D shape or a K shape. Various bracing systems are shown in FIG. 4. The bracing system could comprise bars 13 being pretensioned in order to prevent them from buckling from compression force but could also comprise structural members capable of absorbing compression. The braces are preferably pivotally connected at both ends 14 and 15, by having plain bearings to the damper 16 and to the column base connection 17, as shown in FIG. 2. 18 is the upper frame column.

The reason for using two side plates is to increase the frictional surface area and to provide the necessary symmetry to obtain plane behaviour of the device. All plates and the frictional pads have a centred hole for assembly with a bolt 2 with a nut 5 or similar kind of confining hinge pin. The bolt or similar hinge pin compresses the three plates 1 and 4 of the damper and the frictional pads 4 in a hinge like connection. At the same time the bolt 2 is used to control the normal force applied on the friction pad discs and the steel plates, whereby the damping characteristics of the damper is being changed.

When the damper is installed in a structural frame, as seen in FIG. 2. it follows the horizontal motion of the frame—as seen in FIG. 3. Due to the hinge connection between the central plate and the upper column and hinge connections between the side plates and the braces, again being pivotally connected to the base column, the forces of the movement of the structural frame is being transferred rotatively to the damping parts—as can be seen in FIG. 3. When the displacement of the structural frame starts, the frictional forces developed between the frictional surfaces of the steel plates and the frictional pads will resist the rotation of the plates in the damper. This phase, wherein no sliding takes place, is referred to as a sticking phase. When the applied forces in the damper exceed the frictional forces, a sliding between the central plate and the frictional pad takes place. The plates now slides in a circular movement around the hinge pin or bolt. Due to the tensile forces in the bracing a sliding between the frictional pad and the side plates also starts but the side plates rotates in the opposite direction relative to the central plate. In the sliding phase, the damper will dissipate energy by means of friction between the sliding surfaces. This phase will keep on and change to the sticking phase when the load reverses its direction.

This process of moving from phase to phase is repeated upon reversal of the direction of the force application. FIG. 3 explains the mechanism of the damper device under an excitation force in different directions.

In order to keep a constant clamping force when the damper is in operation, a spring 6 is preferably mounted between the bolt head and the side plate, between the nut and the side plate or at both sides. The spring could be of any kind but in a preferred embodiment of the invention a combination of discs springs 6 and washers 7, such as Belleville Washers, are used. These springs are initially cone shaped annular disc springs that flatten under compression. The washers are placed in order to prevent any marks on the steel plates due to the disc springs when they are in compression The damper is based on a very simple design and comprises only parts that are easily produced. At the same time it is easy to assemble and very flexible in arrangement. As seen in FIG. 4 and FIG. 6 it can be arranged both in different configurations as well as in different types of bracing systems.

The simplicity of the damper design allows constructing a device with multiple units, based on the requirements of the designed friction force and the space limitations. FIG. 5 shows an example of multiple unit dampers, which give the designer the ability to build a damper comprising several units. The damper in FIG. 5 comprise disc springs 9, central plates 10, side plates 11 and frictional pads 12.

Experimental Results

In order to verify the frictional component of the proposed friction damper device, a number of qualification tests have been performed in the laboratory in order to evaluate the theoretical studies of this damper.

The experimental program included two phases:
1. Testing the damper device with three different types of friction materials
2. Testing a scale model steel frame with implemented friction damper device.

Testing the damper with different friction materials done with an Instron machine to verify the parameters which is affecting its performance. These include cyclic tests of the damper. The proper found material were used in the tests of the scale frame model incorporating friction damping device, which were performed by a shaker.

These experimental studies were carried out in the laboratory of BKM department, DTU.

Phase 1, Damper Testing with Instron Machine

The damper specimens, described above, was placed within an Instron hydraulic testing machine type 8502. The actuator of this machine is capable of applying 250 kN dynamic load. Both displacement, forcing frequency or applied force control were possible through a controller unit. The test control was done from the PC running Instron software; "Max 5.2". All testing was done under displacement and forcing frequency control and all the resulting data transferred to Data Acquisition Board System which is integrated with system controller and in conjunction with a PC.

For immediate visual observation of the results, force—displacement curves were drawn on the PC monitor.

The damper fixed to the Instron machine by a frame holder designed especially for this case, the frame being connected rigidly to the machine. The damper connected to this holder by two small plates fixed rigidly to the holder. Each of these plates connected to side plates by a hinge. These two plates were used later to connect the bracing bars to the damper. Inside these plates, a ball bearing was fixed in order to reduce friction through the damper activity with scaled frame model.

The applied load was measured by a dynamometer having two strain gages fixed on it. This dynamometer was connected by a bearing hinge at both ends to prevent any kind of bending.

The clamping force in the bolt was measured using two strain gages embedded inside the bolt. The required clamping force can be applied by tighten the bolt head with a spanner and getting the reading directly from a multimeter.

In the beginning of the damper tests, several displacement devices were tried. Linearly Variable Displacement Transducer (LVDT) was used but because of the rotation of central plate around the bolt, LVDT can not follow that and its needle was bend which did not give a correct measurements. Extensometer (CAT NO. 2620-602, travel 5 mm,type dynamic) was another device been tried to measure the displacement. This device gave much better resolution, but it was not good enough for large displacements, specifically for more than 5 mm amplitude.

All these setting devices were calibrated before and after the tests or whenever there was an accident through the tests, the setting was recalibrated.

When the central plate rotate through the tests, the Potentiometer head, which stand on the edge of the central plate, try to bend little bit because of the horizontal projection of rotation. In order to solve this problem, a special roller had fixed on the head of the potentiometer. This solution was tested several times under several conditions and it went well.

Cyclic Tests of Friction Damper Device

In order to evaluate the damper performance, a series of ten dynamic cyclic tests were performed with three different types of materials; brass, highly frictional material and friction pad material.

The performance of the friction damper is, in general, affected by certain parameters. These parameters were studied in tests, which are:

1. Displacement amplitude.
2. Clamping force.
3. Long run test.

Brass Discs

Brass is cheap and widely available commercial material. It's been used for long time for their known behaviour. Popove, 1993 had suggested to use them for their good and stable performance instead of steel, in his damper. In this work brass was chosen because steel and brass are known that they have a good combination in friction and for economic reasons.

Before studying the above mentioned parameters, another one was tested, which was the distribution of the disc spring washers on one side and two sides of the steel plates.

Displacement Effect

The damper tested with displacement amplitudes of 5, 10, 15 and 20 mm with 0.3 Hz forcing frequency. FIG. 7 shows the applied displacement and resulting hysteresis loops. It's clearly shown that the amount of the area increased with the increase of the displacement and the friction force was almost constant without showing any fluctuation or disturbances.

The higher forces that can be observed at the end of each cycle is because the relative velocity of the plates reach its minimum value.

Clamping Force Effect

The bolt was clamped with different forces to study its effect on damper as shown in FIG. 7. In this tests the clamping force were increased from 13.36 to 27.32 kN, due to that the friction force was increased from 0.65 to 1.5 kN. The result can be seen in FIG. 8.

Long Run Test

A test of 60 cycle were done with 0.3 Hz forcing frequency and 5. mm displacement amplitudes, in order to see any degradation in clamping force. The noises were high and heat generated also remarkably. The results can be seen in FIG. 9.

Test results shows that the amount of change in friction resistance was not much, at the end of 60 cycles, indicating that the initial bolt tension was still effective. During the first ten to twenty load cycles, the bolt connections emitted a roaring noise or chatter vibration from faying surfaces. The load level were not affected much by the presence of these vibratory noise & after approximately twenty cycles, the noise in the faying surfaces emitted a stable rubbing sound similar to metal milling work. The force was increased from 0.76 kN to 0.98 kN. This increase is probably due to many interacting phenomena:

1. Increase of the plate thickness due to heat generated from friction.
2. Softening of the metal due to the rise in temperature.
3. Variation of the bolt clamping force
4. Wear.
5. Growing contribution of the roughness and plowing terms to the slip load as more surface damage was taking place.

Considering that the brass discs have few abrasion, the friction damper with use of brass, can be judged as having sufficient durability under practical condition.

Highly Frictional Material

A material with high friction coefficient was tested. This material is coated with abrasives, which have a trade name called Felxovit, used to grain steel. This material is a fibre disc of 0.3 mm. thickness. It was glued on discs in order to have the required thickness in the damper.

The material gave high frictional forces.

Displacement Effect

The damper tested with displacement amplitudes of 2 and 5 mm. As shown in FIG. 10 the friction force was not constant at sliding and the hysterises are clear that they are not stable The thickness of the connected plates is changing upon cyclic loading. It increase due to temperature rise because of the generated heat caused by friction. On the other hand, wear at the contact surface will reduce the thickness.

If the plate thickness increase due to heat, more than wear effect, it will increase the bolt clamping force, which increase the sliding force. An example was the brass test of 60 cycles, FIG. 10. If wear effect is larger than heat effect, then the bolt will loss its clamping force, which cause sliding to occur at lower design level and this will reduce the amount of energy dissipation in the system. FIG. 10 is an example for such a case.

For the above mentioned reasons there is a need for looking to another materials;

Friction Pad Material

The performance of the damper can be much improved if another material that can resist wear as much as possible, in the same time not generate much heat, also perform a stable hysterises. Such improvement was likely to be achieved by providing a more suitable material combination.

An asbest free friction material (friction pad material) was found after searching for one with a special requirement. This material has a friction coefficient of 0.35–0.45. The max compression strength is 1100 kg/cm.$^2$ and the working temperature is 165° C. It's a composite material.

This was tested with the same previous parameters. No wear or adhesive wear in steel or in the material was noticed, only small amount of powder covered the steel plates.

Displacement Effect

The damper tested with displacement amplitudes of 2, 4, 6, 8, 10 and 12 mm As shown in FIG. 11 the area of energy dissipation was increased in relation with amplitude with a constant friction force. It's clearly shown in FIG. 12 that the damper energy dissipation, which is the area of one cycle is linearly dependent on this parameter which make the damper workable under different displacement amplitudes if its modified to semi-active device.

Clamping Force Effect

The bolt was clamped with different forces (Ft); 3.3, 2.75, 2.2, 1.65, 1.1 and 0.55 kN to study its effect on the damper as shown in FIG. 13. The displacement amplitude was controlled with 5 mm. By plotting the energy dissipation per cycle with respect to clamping forces. It can be concluded that the relation is linear, which make using of Coulomb Law quite sufficient in the relation of the normal force.

The tests showed that the friction pad material have a good and stable performance without showing degradation or fading as clearly seen in displacement time history of 30 cycles test with 0.5 Hz forcing frequency and 3.3 kN clamping force, FIG. 15. These good results were encouraging for long running tests to check their performance.

Long Run Effect, 400 Cycle Test

In order to study the damper performance with the friction pad material under long running cyclic test, the damper was subjected up to 400 cycle with 0.5 Hz frequency and 4 kN clamping force. The results were very encouraging, no fading was notice, very small amount of heat was generated and that cause the slight increase in bolt clamping force, the noise was much less than other materials.

FPM tests showed negligible damage to their friction surface.

The successful performance of FDD in providing stable 'rectangular' hysteresis loops is due to the use of FPM. Results see FIG. 16.

Measuring Coefficient of Friction

According to the FIG. 17-20 it is evident that the test frame restoring force characteristics are bi-linear (as calculated) even if the steel frame is in the elastic range It can be seen that while the damper's frictional force is slightly increased at the beginning of sliding. It continues sliding at a stable frictional force for the entire sliding length after starting to slide. The figures show the damper frictional force—sliding Displacement relationship as an example of their respective test results. There is no fluctuation in the frictional force of the damper. The damper absorbed energy tends to fall as the Frictional Forces rises. Using Frictional Pad Material or Brass which are imbedded gave very stable frictional force and prevented abnormal noise generation at frictional movement.

Since the device can develop such a variable reaction, it can be used as part of a motion control scheme as semi-active device.

The friction damper can work under wide range of displacement amplitudes with constant and stable frictional forces.

The 'frame holder' which was designed to hold the damper through the tests, was not rigid enough to prevent the small horizontal motion of the top part which caused by cyclic motion when large forces been used.

Experiments of a Frame with Friction Damper

A single story, one bay, steel frame model was build and tested statically and dynamically in order to experimentally verify the effectiveness of the friction damper concept. These test of the damper device implemented with steel frame was planed to ascertain the damper performance under practical condition prior to putting it into use of the building.

The overall dimensions of the model frame are 1.125 m. height and 1.10 m span. The frame can be seen in FIG. 21.

The frame structure columns are steel stripes of 50×15 mm. The beam is a hallow rectangular steel section of 90×50×5 mm and rigidly connected to the column by all around butt welding. The structure is fixed rigidly to the massive floor of the laboratory. The ratio of beam moment of inertia (Ib) to column moment of inertia (Icol). is 91.73 in order to assure very rigid beam.

This frame model has the following properties

|  | Lateral stiffness (N/mm) | Mass (kg) | Lowest Natural Frequency, Hz |
| --- | --- | --- | --- |
| Measured | 40.667 | 23.03 | 6.8 |
| Calculated | 40.57 | 23.65 | 6.7 |

The steel frame was excited by static and dynamic horizontal forces applied by means of exciter. This exciter is connected to the steel frame by rigid bar. The natural period of the frame without the damper was 6.8 Hz, measured by free vibration test. A digital storage oscilloscope VP5730A was used in this test.

Dynamic Response of Frame Model

In order to check the dynamic proprieties of the frame model; the stiffness and the mass, harmonic loading was applied by the exciter. The response was compared with analytical solution of this SDOF system. The results were very satisfactory as shown in FIG. 22

Experimental Setup

The frame girder is excited horizontally with a force, experimentally applied by rigid bar, fixed between the frame girder and the exciter head. The oscillation of the exciter head is generated by the Exciter controller and amplified by the Power amplifier. The force transferred between the structure and the attached rigid bar is measured by is measured by force a Force Transducer. This measured force is continuously stored by the DAP Program. The acceleration of the frame is measured by an Accelerometer, which is mounted at the top of the frame and the measurements stored continuously by the DAP. The position of the frame was obtained using potentiometer with a roller head rigidly mounted on external frame holder. The setup is schematically shown in FIG. 23.

The relative rotation between the steel plates was measured by a potentiometer, with a roller head, fixed on side plate. These measurements divided by the distance between the potentiometer head and the center-line of side plate. The rotation of central plate was measured by another potentiometer, and the readings were divided by the distance between the head and the center of the hinge that connect the damper to the frame girder.

Dynamic Response of Frame Model with Friction Damper—Experimental Evaluation Parametric Studies Several parameters were studied experimentally to verify the performance of the damper and to study their dependency. These parameters were as fellow:

Forcing frequency.

Displacement amplitude.

Clamping force in damper.

Forcing amplitude.

Prestressing forces in bracing bars.

Forcing Frequency In a Frame

One of the most important parameter in verifying the friction damper devices is the velocity dependency. The frame were tested by 2.0, 3.0, 4.0, 5.0, 6.0 and 7.0 Hz forcing frequency with same value for all the other parameters. The results, which represent moment and relative rotation between the plates, Theta, show clearly that it is almost velocity independent as it is shown in FIG. 20.

As it is shown, the effect of changing forcing frequency is not affecting much the Moment Theta relation plots, which cancel the necessity to include a velocity dependency term in Coulomb Law for modeling the friction force. Another relation was studied which is horizontal force (Fh) with frame displacement. FIG. 25 clearly show that there is no big influence on the response.

Displacement Amplitude

The frame was tested with different displacement amplitudes in order to verify its influence on the damper behavior. In these tests the frame displacement was controlled with 1.75, 2, 2.5, 3, 3.5, 4 and 4.5 mm as shown in FIG. 27. The energy dissipation, which is the area of force—displacement curve, for each amplitude was, plotted verse frame displacement in FIG. 27.

It is clearly shown that varying the displacement amplitude is linearly changing the dissipation energy, which is match with what is found earlier in the tests of the damper with Instron machine.

Clamping Force in Damper

In order to verify the dependency of clamping force, different values were selected starting from 3.77, 4.55, 5.55, 5.86, 6.63 & 6.89 kN. In these tests the displacement amplitudes were controlled so they have the same amplitudes but the force amplitude required to produce a certain displacement, were different because of the damper clamping force, as shown in FIG. 28.

In FIG. 28 it's clearly show that increasing bolt-lamping force in damper is almost linearly increase the energy dissipation. This conclusion agrees with that been reached in the $1^{st}$ phase of the damper tests. The linearity of this relation lead to use Coulomb law for modeling the friction force.

Forcing Amplitude

Different force amplitudes were used to excite the frame. The Clamping force, pre-stressing force in bracing and forcing frequency were controlled and different forces starting from 0.40, 0.50, 0.60, 0.70, 0.75, 0.80, 0.85 and 0.90 kN were used as shown in FIG. 29.

Because of the setting of these tests the damper did not activate under 0.4, 0.5 and 0.6 kN and no sliding occurred, only sticking but when the load increased to 0.7 kN, sliding were started and the displacement was increasing whenever the force increased. In FIG. 11B the frame respond with small nonlinearly especially when a force of 0.8 kN were used and went larger for 0.85 and 0.9 kN.

Prestressing Forces in Bracing Bars

In evaluating this parameter two types of test were performed;

1.1. A—Large clamping force, sticking only.

1.1. B—Small clamping force, sticking and sliding.

In both cases the frame was excited with 3.0 Hz forcing frequency and 0.8 kN force amplitude with large value of clamping force which prevent sliding to occurred. Results see FIG. 30.

1.1. A—Large clamping force, sticking only.

In these tests, the bracing bars were pre-stressed with 1.02, 2.2, 4.4, 6.9. 8.8 and 10.1 kN respectively. From FIG. (11) its clearly seen that increasing pre-stressing force did not lead to decrease the frame displacements, especially with forces of 1.02–6.9 kN. But when forces increased to 8.8 and 10.1 kN sliding were started because the stiffness of the bracing system become very large and prevent the horizontal motion of side plates, but the applied forces will overcome the frictional forces which caused sliding of plates.

1.1. B—Small damping force, sticking and sliding.

Four different pre-stressing forces 2.0, 4.0, 6.0 and 7.7 kN were used in these tests. It is clearly shown in FIG. (11) that increasing pre-stressing force did not affect much on the horizontal frame displacement except the lowest value.

So from these tests of verifying the effect of pre-stressing parameter it can be concluded that it is not playing a big part in damper performance and increasing the forces dose not lead to improve the performance and with the use of optimum pre-stressing forces the same required response can be reached.

Long Run Tests

The damped steel frame model was tested with long running tests under different frequencies and excitation forces. FIG. 16 show time history test results of 3.0 Hz forcing frequency and excitation force of 0.8 kN. The frame response was very stable and constant, 20 B, and the relative rotation of the plates was also stable, FIG. 16D. So the conclusion was after more than 100 cycle test that the damper performance was quite satisfactory.

It was also planed to subject the frame to hundreds of cyclic test but the setup limitations prevents that. Results are shown in FIG. 32.

What is claimed is:

1. A device for damping movements of structural and non structural elements in civil engineering structures, the device comprising:
    at least two members being interconnected in a rotational joint for frictional damping of relative rotational movement between the at least two members, the two members rotationally moving in opposite directions,
    clamping means for clamping the at least two members together, so as to maintain a clamping force and friction between the at least two members in the rotational joint,
    means for connecting each of the at least two members to respective ones of the structural elements.

2. A device according to claim 1, further comprising a frictional pad arranged between the two members so as to establish contact between the members and the frictional pad so that the relative rotational movement of the members is dampened by friction.

3. A device according to claim 1, wherein the clamping means are adapted to vary the clamping force.

4. A device according to claim 1, wherein the joint comprises a pin extending through each of the at least two members.

5. A device according to claim 4, comprising a bolt, at least a portion of the bolt constituting the pin, the bolt having:
    a bolt member with a bolt head,
    a nut with a nut head,
    the clamping force being determined by the pretension of the bolt.

6. A device according to claim 5, further comprising means for maintaining a substantially constant clamping force with time.

7. A device according to claim 6, wherein the means for maintaining a substantially constant clamping force comprises at least one spring arranged between the bolt head and a surface of one of the members and/or between the nut head and a surface of one of the members.

8. A device according to claim 7, wherein the spring comprises a disc spring.

9. A device according to claim 8, comprising at least two disc springs.

10. A device according to claim 9, wherein at least one disc spring is arranged between the bolt head and a surface of one of the members, and wherein at least one disc spring is arranged between the nut head and a surface of another one of the members.

11. A device according to claim 6, wherein the means for maintaining a substantially constant clamping force comprise hydraulic, pneumatic and/or electric means for maintaining the clamping force.

12. A device according to claim 1, wherein the at least two members comprise: a side plate and a central plate extending in substantially parallel planes.

13. A device according to claim 12, wherein the frictional pad is arranged between the side plate and the central plate.

14. A device according to claim 12, and comprising two side plates arranged symmetrically around the central plate.

15. A device according to claim 14, comprising two frictional pads, each frictional pad being arranged between a respective one of the side plates and the central plate.

16. A device according to claim 12, wherein the central plate is adapted to be connected to one of the structural elements in a pivotal manner, so as to allow relative rotational movement between the central plate and the structural element.

17. A device according to claim 12, wherein the central plate is adapted to be connected to one of the structural elements in a fixed manner, so as to prevent relative movement between the central plate and the structural element.

18. A device according to claim 14, wherein the side plates are adapted to be connected to one of the structural elements in a pivotal manner, so as to allow relative rotational movement between the side plates and the structural element.

19. A device according to claim 14, wherein the side plates are adapted to be connected to one of the structural elements in a fixed manner, so as to prevent relative movement between the side plates and the structural element.

20. A device according to claim 1, wherein the friction pad material comprises a MK101 asbestos free friction material by Eurodeal A/S.

21. A device according to claim 1, wherein the at least two members are made of steel, anti-corrosive steel, brass, aluminium or any alloys comprising aluminium or any other steel material or composite of steel and plastics or composites of plastics and fibres of glass, carbon, Kevlar or similar or composites of any ceramics materials and fibres of glass, carbon, Kevlar or similar.

22. A device according to claim 1, wherein the clamping force shows a variation of less than 5% in a 400 cycle test with 0.5 Hz±0.1 Hz forcing excitement frequency and an displacement amplitude of one of the at least two members of up to 10 mm at an applied excitement force of ±2.5 kN and an initial clamping force of 4 kN±0.5 kN.

23. A device according to claim 1 wherein the frictional moment in the frictional joint of the device shows a forcing frequency dependent variation of less than 5% in the range 2–7 Hz at a nominal frictional moment of 200 Nm±20 Nm in 30-cycle tests at each frequency.

24. A device according to claim 1, having a substantially linear relationship between displacement amplitude of one of the at least two members and energy dissipation in the frictional joint.

25. A device for damping movements of panel walls in building structures, the device comprising:

at least one member interconnected to at least one panel in a first rotational joint, the at least one member being further connected to another panel or similar part of the building structure in a second rotational joint, one or both of the first or the second rotational joints providing a frictional damping of relative movement between the at least one member and the panel or similar building structure, one or both of the first or the second rotational joints further providing a sliding movement of the at least one member in relation to the panel or similar building structure to which it is attached, clamping means for clamping the at least one member together with the panel or similar building structure, so as to maintain a clamping force and friction between the at least one member and the panel or similar building structure in the rotational joint.

\* \* \* \* \*